US012026590B2

(12) United States Patent
Yu et al.

(10) Patent No.: US 12,026,590 B2
(45) Date of Patent: Jul. 2, 2024

(54) QUANTUM COMPUTING TASK PROCESSING METHOD, SYSTEM AND APPARATUS, AND OPERATING SYSTEM

(71) Applicant: Origin Quantum Computing Technology (Hefei) Co., Ltd, Hefei (CN)

(72) Inventors: Lei Yu, Hefei (CN); Wentao Wang, Hefei (CN); Dongyi Zhao, Hefei (CN); Jing Wang, Hefei (CN)

(73) Assignee: Origin Quantum Computing Technology (Hefei) Co., Ltd, Hefei (CN)

( * ) Notice: Subject to any disclaimer, the term of this patent is extended or adjusted under 35 U.S.C. 154(b) by 0 days.

(21) Appl. No.: 18/521,121

(22) Filed: Nov. 28, 2023

(65) Prior Publication Data

US 2024/0104417 A1 Mar. 28, 2024

Related U.S. Application Data

(63) Continuation of application No. PCT/CN2022/096726, filed on Jun. 2, 2022.

(30) Foreign Application Priority Data

| Jun. 23, 2021 | (CN) | 202110699180.7 |
| Jun. 23, 2021 | (CN) | 202110699191.5 |
| Jun. 23, 2021 | (CN) | 202110700663.4 |

(51) Int. Cl.
*G06N 10/20* (2022.01)
*G06F 9/48* (2006.01)
(Continued)

(52) U.S. Cl.
CPC ........... *G06N 10/80* (2022.01); *G06F 9/4881* (2013.01); *G06N 10/40* (2022.01)

(58) Field of Classification Search
CPC ....... G06N 10/80; G06N 10/40; G06F 9/4881
See application file for complete search history.

(56) References Cited

U.S. PATENT DOCUMENTS

| 11,868,846 B1 * | 1/2024 | Shields | G06F 11/3457 |
| 2017/0223143 A1 * | 8/2017 | Johnson | G06F 9/541 |
| (Continued) | | | |

FOREIGN PATENT DOCUMENTS

| CN | 110648348 A | 1/2020 |
| CN | 111599414 A | 8/2020 |
| (Continued) | | |

OTHER PUBLICATIONS

International Search Report issued in corresponding PCT Application No. PCT/CN2022/096726, dated Aug. 31, 2022.
(Continued)

*Primary Examiner* — Wissam Rashid
(74) *Attorney, Agent, or Firm* — Westbridge IP LLC

(57) ABSTRACT

Disclosed are a quantum computing task processing method and a quantum computing task processing apparatus, and a quantum computer operating system. The method includes: cutting a quantum circuit corresponding to a quantum computing task into a plurality of quantum sub-circuits based on an evolution process of a quantum state of a qubit in the quantum circuit; separately preparing an initial quantum state of a qubit in each of the quantum sub-circuits; measuring a qubit, obtained after the initial quantum state is prepared, in each of the quantum sub-circuits, to obtain measurement results of each of the quantum sub-circuits; and combining the measurement results of each of the quantum sub-circuits to obtain computation results of the quantum computing task.

18 Claims, 12 Drawing Sheets

(51) Int. Cl.
    *G06N 10/40*     (2022.01)
    *G06N 10/80*     (2022.01)

(56) References Cited

U.S. PATENT DOCUMENTS

2019/0095561 A1\* 3/2019 Pednault ................ G06F 17/16
2021/0334079 A1\* 10/2021 Gambetta .............. G06N 10/00

FOREIGN PATENT DOCUMENTS

| CN | 111767055 A | 10/2020 |
| CN | 112465146 A | 3/2021 |
| CN | 112633508 A | 4/2021 |
| WO | 2017131081 A1 | 8/2017 |

OTHER PUBLICATIONS

Written Opinion ssued in corresponding PCT Application No. PCT/CN2022/096726, dated Aug. 31, 2022.

\* cited by examiner

QUANTUM COMPUTING TASK PROCESSING METHOD, SYSTEM AND APPARATUS, AND OPERATING SYSTEM

CROSS-REFERENCE TO RELATED APPLICATIONS

This application is a continuation of International Application No.PCT/CN2022/096726, filed on Jun. 2, 2022, which claims priority to Chinese Patent Application No. CN202110700663.4, filed on Jun. 23, 2021 and entitled "QUANTUM COMPUTING TASK PROCESSING METHOD AND APPARATUS, AND QUANTUM COMPUTER OPERATING SYSTEM", Chinese Patent Application No. CN202110699191.5, filed on Jun. 23, 2021 and entitled "QUANTUM COMPUTING TASK PROCESSING METHOD AND APPARATUS, AND QUANTUM COMPUTER OPERATING SYSTEM", and Chinese Patent Application No. 202110699180.7, filed on Jun. 23, 2021 and entitled "DISTRIBUTED QUANTUM COMPUTING SYSTEM". The disclosures of the aforementioned applications are hereby incorporated by reference in their entireties.

TECHNICAL FIELD

The present application relates to the field of quantum computation technologies, and in particular, to a quantum computing task processing method, a distributed quantum computing system, a quantum computing task processing apparatus, an electronic device, a computer-readable storage medium, and a quantum computer operating system.

BACKGROUND

With the development of computing technologies, some computing tasks require very huge computing power to be completed. If centralized computing is used, it takes quite a lot of time to complete the computation. Distributed computing is to decompose a computing task into a plurality of mutually independent sub-tasks, and allocate the sub-tasks to a plurality of computing devices for processing, thereby saving computing time and improving computing efficiency.

A core problem of the distributed computing is how to decompose the original computing task. The decomposition of the original computational task in classical computing is usually based on data decomposition. Raw data is decomposed into a plurality of pieces of sub-data, and then the plurality of pieces of sub-data are calculated by means of the same algorithm model on a plurality of computing devices. Thus, computing sub-tasks are mutually independent.

Quantum computing is different from classical computing. A quantum computing task thereof generally corresponds to a quantum circuit, and decomposition of an original computing task is generally based on a quantum circuit. Since decomposed sub-circuits have a sequential order, and an input of a last sub-circuit affects an output of a current sub-circuit, computing sub-tasks are not mutually independent. Therefore, how to decompose a quantum computing task into a plurality of independent quantum computing sub-tasks to implement distributed computing of the quantum computing task is a technical problem to be solved.

SUMMARY

Embodiments of the present application provide a technical solution for processing a quantum computing task, to decompose a quantum computing task into a plurality of independent quantum computing sub-tasks, thereby implementing distributed computing of the quantum computing task.

According to a first aspect, an embodiment of the present application provides a quantum computing task processing method, including: cutting a quantum circuit corresponding to a quantum computing task into a plurality of quantum sub-circuits based on an evolution process of a quantum state of a qubit in the quantum circuit; separately preparing an initial quantum state of a qubit in each of the quantum sub-circuits; measuring a qubit, obtained after the initial quantum state is prepared, in each of the quantum sub-circuits, to obtain measurement results of each of the quantum sub-circuits; and combining the measurement results of each of the quantum sub-circuits to obtain computation results of the quantum computing task.

According to a second aspect, an embodiment of the present application provides a quantum computing task processing method, where the method is applied to a distributed quantum computing system including a server and a computing device, and includes: receiving, by the server, a quantum computing task sent by a user equipment; processing, by the server, the quantum computing task based on a computing resource currently allowed to be used by the computing device, to obtain a plurality of computing sub-tasks, and distributing the plurality of computing sub-tasks to the computing device; receiving, by the server, a plurality of sub-computation-results returned by the computing device for the plurality of computing sub-tasks, and combining the plurality of sub-computation-results to obtain computation results of the quantum computing task; and returning, by the server, the computation results to the user equipment.

Optionally, there are a plurality of computing devices, the computing resource currently allowed to be used includes a qubit currently allowed to be used, and the processing, by the server, the quantum computing task based on a computing resource currently allowed to be used by the computing device, to obtain a plurality of computing sub-tasks includes: determining, by the server, a qubit currently allowed to be used by each computing device; determining, by the server, a target computing device based on the qubit currently allowed to be used by each computing device and a number of the qubits required by a quantum circuit corresponding to the quantum computing task; determining, by the server based on a qubit currently allowed to be used by the target computing device, a cutting position of the quantum circuit corresponding to the quantum computing task; and cutting, by the server, the quantum circuit into a plurality of quantum sub-circuits based on the cutting position of the quantum circuit, where each quantum sub-circuit corresponds to one computing sub-task.

Optionally, the determining, by the server, a target computing device based on the qubit currently allowed to be used by each computing device and a number of the qubits required by a quantum circuit corresponding to the quantum computing task includes: determining, by the server, a plurality of device combination strategies based on the qubit currently allowed to be used by each computing device and the number of the qubits required by the quantum circuit corresponding to the quantum computing task, where each device combination strategy includes a plurality of computing devices; determining, by the server, a target device combination strategy based on a number of computing devices in each device combination strategy and a total number of qubits currently allowed to be used; and determining, by the server, a plurality of computing devices included in the target device combination strategy as target computing devices.

Optionally, the determining, by the server, a target device combination strategy based on a number of computing devices in each device combination strategy and a total number of qubits currently allowed to be used includes: determining, by the server as the target device combination strategy, a device combination strategy having the least number of computing devices and/or the least total number of qubits currently allowed to be used.

Optionally, the method further includes: determining, by the server, a number of qubits currently allowed to be used by each computing device in each device combination strategy; determining, by the server based on the number of qubits currently allowed to be used by each computing device in each device combination strategy, a maximum number of qubits currently allowed to be used by a single computing device in each device combination strategy; and determining, by the server as the target device combination strategy, a device combination strategy having the smallest maximum number of qubits currently allowed to be used by a single computing device.

Optionally, the combining, by the server, the plurality of sub-computation-results to obtain computation results of the quantum computing task includes: determining, by the server, a plurality of tensors corresponding to the plurality of sub-computation-results; and determining, by the server as the computation results of the quantum computing task, a tensor obtained by contracting the plurality of tensors.

According to a third aspect, an embodiment of the present application provides a quantum computing task processing apparatus, including: a cutting unit, configured to cut a quantum circuit corresponding to a quantum computing task into a plurality of quantum sub-circuits based on an evolution process of a quantum state of a qubit in the quantum circuit; a preparation unit, configured to separately prepare an initial quantum state of a qubit in each of the quantum sub-circuits; a measurement unit, configured to measure a qubit, obtained after the initial quantum state is prepared, in each of the quantum sub-circuits, to obtain measurement results of each of the quantum sub-circuits; and a combination unit, configured to combine the measurement results of each of the quantum sub-circuits to obtain computation results of the quantum computing task.

According to a fourth aspect, an embodiment of the present application provides a quantum computing task processing apparatus, where the apparatus is applied to a distributed quantum computing system including a server and a computing device, and includes: a task transceiver unit, configured to receive a quantum computing task sent by a user equipment; and a task processing unit, configured to process the quantum computing task based on a computing resource currently allowed to be used by the computing device, to obtain a plurality of computing sub-tasks. The task transceiver unit is further configured to: distribute the plurality of computing sub-tasks to the computing device; and receive a plurality of sub-computation-results returned by the computing device for the plurality of computing sub-tasks. The task processing unit is further configured to combine the plurality of sub-computation-results to obtain computation results of the quantum computing task. The task transceiver unit is further configured to return the computation results to the user equipment.

According to a fifth aspect, an embodiment of the present application provides an electronic device, including a processor, a memory, a communications interface, and one or more programs. The one or more programs are stored in the memory and configured to be executed by the processor, and the programs include instructions for executing steps in the method according to the embodiments of the present application.

According to a sixth aspect, an embodiment of the present application provides a computer-readable storage medium. The computer-readable storage medium stores a computer program for exchanging electronic data, where the computer program causes a computer to perform some or all of the steps in the method according to the embodiments of the present application.

According to a seventh aspect, an embodiment of the present application provides a computer program product. The computer program product includes a non-transitory computer-readable storage medium storing the computer program, and the computer program is operable to cause a computer to perform some or all of the steps in the method according to the embodiments of the application. The computer program product may be a software installation package.

According to an eighth aspect, an embodiment of the present application provides a quantum computer operating system. The quantum computer operating system implements processing of a quantum computing task according to some or all of the steps in the method according to the embodiments of the present application.

According to a ninth aspect, an embodiment of the present application provides a distributed quantum computing system including a client, a server, and a computing node, where the computing node includes a quantum computing resource node and a classical computing resource node. The client is configured to: parse a quantum application into a hybrid quantum-classical executable program, and submit the hybrid quantum-classical executable program to the server. The server is configured to: acquire a quantum computing task corresponding to a quantum program part in the hybrid quantum-classical executable program; cut, based on an evolution process of a quantum state of a qubit in a quantum circuit and quantum computing resource information, the quantum circuit corresponding to the quantum computing task into a plurality of quantum sub-circuits to be prepared; perform initial state preparation on and compilation the plurality of quantum sub-circuits to be prepared, to obtain a plurality of executable quantum sub-circuits; and send the plurality of executable quantum sub-circuits to the quantum computing resource node. The server is further configured to: acquire a classical computing task corresponding to a classical program part in the hybrid quantum-classical executable program, and send the classical computing task to the classical computing resource node. The quantum computing resource node is configured to run the plurality of executable quantum sub-circuits to obtain a plurality of quantum sub-computation-results. The classical computing resource node is configured to execute the classical computing task to obtain a classical computation result. The server is further configured to: combine the plurality of quantum sub-computation-results and the classical computation result to obtain computation results of the quantum application, and return the computation results of the quantum application to the client.

Optionally, the quantum computing resource node is one or a combination of a physical quantum computing node based on a quantum processor or a virtual quantum computing resource based on quantum simulation computing.

Optionally, the server includes a quantum computer operating system, a system service layer of the quantum computer operating system includes a quantum service module, and the quantum service module includes a quantum task processing unit, a quantum resource management unit, and a quantum circuit compiling unit. The quantum task processing unit is configured to acquire a quantum computing task corresponding to the hybrid quantum-classical executable program. The quantum resource management unit is configured to acquire quantum computing resource information of the quantum computing resource node. The quantum task processing unit is further configured to: cut, based on the evolution process of a quantum state of a qubit in the quantum circuit and the quantum computing resource information, the quantum circuit corresponding to the quantum computing task into a plurality of quantum sub-circuits to be prepared, and submit the plurality of quantum sub-circuits to be prepared to the quantum circuit compiling unit. The quantum circuit compiling unit is configured to: perform initial state preparation on and compilation the plurality of quantum sub-circuits to be prepared, to obtain a plurality of executable quantum sub-circuits, and send the plurality of executable quantum sub-circuits to the quantum computing resource node.

Optionally, in terms of the cutting, based on the evolution process of a quantum state of a qubit in the quantum circuit and the quantum computing resource information, the quantum circuit corresponding to the quantum computing task into a plurality of quantum sub-circuits to be prepared, the quantum task processing unit is configured to: acquire a connected graph of the quantum circuit corresponding to the quantum computing task, where a vertex of the connected graph is used to represent a quantum logic gate in the quantum circuit, and a directed edge of the connected graph is used to represent a dependency relationship of the quantum logic gate in an evolution time sequence of a quantum state of a qubit; determine a vertex of a connected sub-graph of the connected graph based on the quantum computing resource information, and determine a first cut position of the connected graph based on the vertex of the connected sub-graph; and determine a cutting position, on the quantum circuit, corresponding to the first cut point, and cut the quantum circuit based on the cutting position to obtain the plurality of quantum sub-circuits to be prepared.

Optionally, the quantum computing resource information includes a number of qubits currently available for the quantum computing resource node. In terms of the determining a vertex of a connected sub-graph of the connected graph based on the quantum computing resource information, the quantum task processing unit is configured to: determine the vertex of the connected sub-graph of the connected graph, where a number of qubits included in the vertex of the connected sub-graph is less than or equal to a number of qubits currently available for a quantum computing resource node corresponding to the connected sub-graph.

Optionally, in terms of the determining a cutting position, on the quantum circuit, corresponding to the first cut point, the quantum task processing unit is configured to: determine two vertexes of a directed edge where the first cut position is located; determine two quantum logic gates, corresponding to the two vertexes, in the quantum circuit; and use, as the cutting position, a change in a same qubit acted on by the two quantum logic gates from a quantum state evolution corresponding to an action of one quantum logic gate to a quantum state evolution corresponding to an action of the other quantum logic gate.

Optionally, in terms of the performing initial state preparation on and compilation the plurality of quantum sub-circuits to be prepared, to obtain a plurality of executable quantum sub-circuits, the quantum circuit compiling unit is configured to: receive the plurality of quantum sub-circuits to be prepared sent by the quantum task processing unit, where the quantum sub-circuits to be prepared include a first qubit and a second qubit, a timeline where the first qubit is located is not cut, and a timeline where the second qubit is located is cut; prepare a first quantum state from an initial quantum state of the first qubit by using a first unitary matrix; and if the timeline where the second qubit is located is an upstream timeline obtained through cutting, prepare the first quantum state from an initial quantum state of the second qubit by using the first unitary matrix; if the timeline where the second qubit is located is a downstream timeline obtained through cutting, prepare a second quantum state from an initial quantum state of the second qubit by using a second unitary matrix, where the upstream timeline is a timeline located before a cutting position, and the downstream timeline is a timeline located after the cutting position; and compile a plurality of quantum sub-circuits to be prepared for which the first quantum state and the second quantum state are prepared, to obtain a plurality of executable quantum sub-circuits.

Optionally, in terms of the running the plurality of executable quantum sub-circuits to obtain a plurality of quantum computation results, the quantum computing resource node is configured to: measure, on a first measurement basis, a final quantum state of the first qubit obtained after the plurality of executable quantum sub-circuits are run; if the timeline where the second qubit is located is a downstream timeline located after the cutting position, measure, on the first measurement basis, a final quantum state of the second qubit obtained after the plurality of executable quantum sub-circuits are run; if the timeline where the second qubit is located is an upstream timeline located after the cutting position, measure, on a second measurement basis, a final quantum state of the second qubit obtained after the plurality of executable quantum sub-circuits are run; and determine the plurality of quantum sub-computation-results based on the final quantum state of the first qubit and the final quantum state of the second qubit.

Optionally, in terms of the combining the plurality of quantum sub-computation-results and the classical computation result to obtain computation results of the quantum application, the server is further configured to: determine a plurality of tensors corresponding to the plurality of quantum sub-computation-results; determine, as a quantum computation result, a tensor obtained by contracting the plurality of tensors; and combine the quantum computation results and the classical computation result to the computation results of the quantum application.

Optionally, the client includes a quantum computer operating system, an application layer of the quantum computer operating system includes the quantum application, and the quantum application is a hybrid quantum-classical application written in a quantum programming language.

Optionally, the client includes a quantum compiler, and the quantum compiler is configured to parse the quantum application into a hybrid quantum-classical executable program.

It may be learned that in this embodiment, initial quantum state preparation of each quantum sub-circuit is implemented, so that each quantum sub-circuit may run independently on different devices. The quantum sub-circuit may run independently, and therefore, a qubit of each quantum sub-circuit may be separately measured to obtain a measurement result. Finally, measurement results of all quantum sub-circuits are synthesized, thereby implementing distributed computing of a quantum computing task.

It may be learned that, in this embodiment of the present application, a server and a computing device form a distributed quantum computing system. Based on a computing resource currently allowed to be used by the computing device, a quantum computing task is divided into a plurality of computing sub-tasks, and the plurality of computing sub-tasks are processed by the computing device. A distributed quantum computing task processing manner is used, which breaks through a limitation on a quantity of qubits, so that processing of a computing task that cannot be separately processed by a single noisy intermediate-scale quantum (Noisy Intermediate-Scale Quantum, NISQ) device is implemented, thereby saving computing time and improving computing efficiency.

It may be learned that in this embodiment of the present application, the distributed quantum computing system includes a client, a server, and a computing node, and the computing node includes a quantum computing resource node and a classical computing resource node. The server decomposes a hybrid quantum-classical executable program sent by the client into a quantum computing task and a classical computing task, the quantum computing task is sent to the quantum computing resource node for processing, and the classical computing task is sent to the classical computing resource node for processing, thereby implementing distributed processing of the quantum computing task and the classical computing task, and further implementing efficient running of a quantum application.

In terms of sending the quantum computing task to the quantum computing resource node for processing, distributed processing of the quantum computing task may be implemented, thereby implementing efficient running of the quantum application.

It may be learned that in this embodiment of the present application, not only distributed processing of a quantum computing task and a classical computing task can be implemented, but also distributed processing of a quantum computing task itself can be implemented, thereby implementing efficient running of a quantum application.

These aspects or other aspects of the present application are clearer and easier to understand in the following descriptions of the embodiments.

BRIEF DESCRIPTION OF THE DRAWINGS

To describe the technical solutions in the embodiments of the present application or in the conventional technology more clearly, the following briefly describes the accompanying drawings required for describing the embodiments or the conventional technology. Apparently, the accompanying drawings in the following description only show some embodiments of the present application, and a person of ordinary skill in the art may still derive other drawings from these accompanying drawings without creative efforts.

DETAILED DESCRIPTION OF THE EMBODIMENTS

To make a person skilled in the art better understand technical solutions of the present application, the following clearly and completely describes the technical solutions in the embodiments of the present application with reference to the accompanying drawings in the embodiments of the present application. Apparently, the described embodiments are only some rather than all of the embodiments of the present application. All other embodiments obtained by a person of ordinary skill in the art based on the embodiments of the present application without creative efforts shall fall within the protection scope of the present application.

Descriptions are separately provided in detail below.

The terms "first", "second", "third", "fourth", and the like in the specification, claims, and drawings of the present application are used to distinguish between different objects, rather than to describe a specific order. In addition, the terms "comprise" and "have" and any variations thereof are intended to cover a non-exclusive inclusion. For example, a process, method, system, product, or device that includes a series of steps or units is not necessarily limited to those listed steps or units, but optionally further includes other steps or units that are not listed or inherent to such a process, method, system, product, or device.

The "embodiment" mentioned in this specification means that a specific feature, structure, or characteristic described in combination with the embodiment may be included in at least one embodiment of the present application. The occurrences of the term in various places in the specification are not necessarily all referring to a same embodiment, nor are separate or alternative embodiments mutually exclusive of other embodiments. It is understood explicitly and implicitly by those skilled in the art that the embodiments described herein may be combined with other embodiments.

Figure 1A:
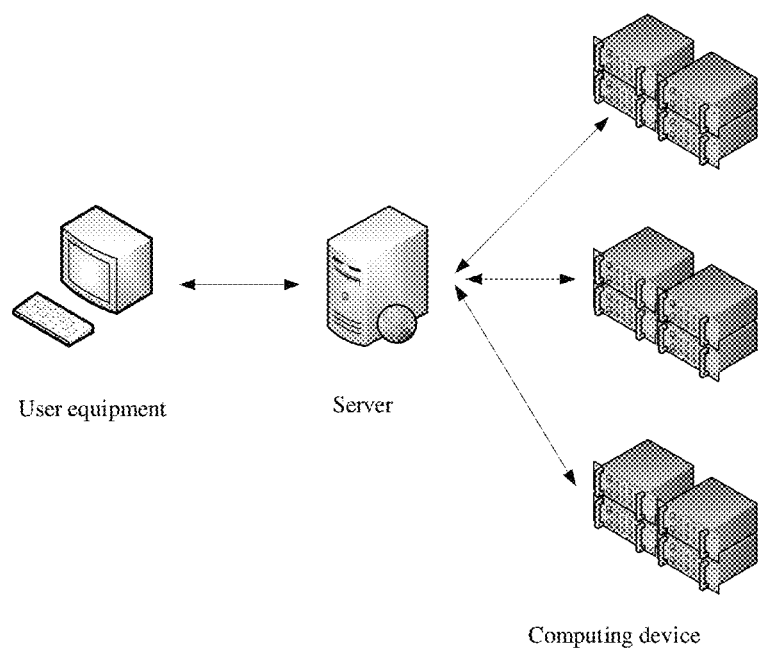
FIG. 1A is a schematic structural diagram of a quantum computing task processing system according to the present application.
Figure 1B:
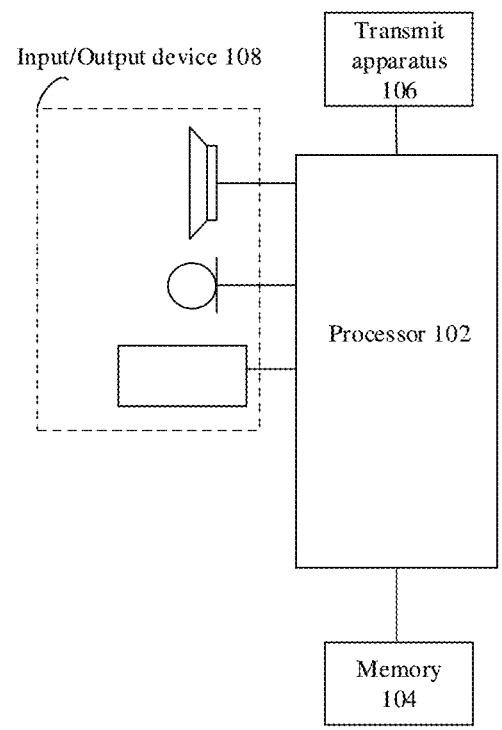
FIG. 1B is a block diagram of a hardware structure of a computer terminal in a quantum computing task processing method according to an embodiment of the present application.

FIG. 1A is a schematic structural diagram of a quantum computing task processing system according to the present application. As shown in FIG. 1A, the quantum computing task processing system includes a user equipment, a server, and a computing device. The computing device may be a quantum computer, a quantum virtual machine, or a high-performance classical computing cluster. FIG. 1B is a block diagram of a hardware structure of a computer terminal used in a quantum computing task processing method according to an embodiment of the present application. The computer terminal may be a user equipment, a server, or a computing device in FIG. 1A.

As shown in FIG. 1B, the computer terminal may include one or more processors 102 (only one processor is shown in FIG. 1B) (the processor 102 may include but is not limited to a processing apparatus such as a microprocessor MCU or a programmable logic device FPGA), and a memory 104 configured to store data. Optionally, the computer terminal may further include a transmission apparatus 106 and an input/output device 108 that are configured to implement a communication function. A person of ordinary skill in the art may understand that the structure shown in FIG. 1B is merely an example and does not constitute any limitation on a structure of the computer terminal. For example, the computer terminal may alternatively include more or fewer components than those shown in FIG. 1B, or have a configuration different from that shown in FIG. 1B.

The memory 104 may be configured to store a software program and a software module of application software, for example, program instructions/modules corresponding to the quantum computing task processing method in embodiments of the present application. By running the software program and the software module stored in the memory 104, the processor 102 executes various functional applications and data processing, that is, implements the foregoing method. The memory 104 may include a high-speed random access memory, and may further include a non-volatile memory, for example, one or more disk storage apparatus, a flash memory, or another non-volatile solid-state memory. In some embodiments, the memory 104 may further include a memory remotely disposed relative to the processor 102, which may be connected to a computer terminal over a network. Examples of the network include but are not limited to the Internet, a corporate intranet, a local area network, a mobile communication network, and a combination thereof.

The transmission apparatus 106 is configured to receive or send data over a network. A specific example of the network may include a wireless network provided by a communication provider of a computer terminal. In an example, the transmission apparatus 106 includes a network interface controller (Network Interface Controller, NIC) that may be connected to another network device by using a base station, so as to communicate with the Internet. In an example, the transmission apparatus 106 may be a radio frequency (Radio Frequency, RF) module. The radio frequency module is configured to communicate with the Internet in a wireless manner.

It should be noted that, the quantum program in this embodiment of the present application is a program that is written in a classical language and that indicates qubits and their evolution. Herein, qubits, quantum logic gates, and the like related to quantum computation are all represented by corresponding classical code.

A quantum computer actually is a hybrid structure that includes two main parts: One is a classical computer responsible for classical computation and control. The other is a quantum device responsible for running quantum programs to implement quantum computation. The quantum program is an instruction sequence that is written in a quantum language such as the QRunes language and that can be run on a quantum computer. In this way, quantum logic gate operations are supported, and ultimately quantum computation is implemented. Specifically, the quantum program is an instruction sequence through which quantum logic gates are operated in a specific time sequence.

In actual application, limited by the development of hardware of a quantum device, quantum computation simulation often needs to be performed to verify a quantum algorithm, quantum application, and the like. The quantum computation simulation is a process in which virtual architecture (namely, a quantum virtual machine) built by using resources of a common computer realizes simulation of running a quantum program corresponding to a specific problem. Generally, the quantum program corresponding to the specific problem needs to be constructed. The quantum program in this embodiment of the present application is a program that is written in a classical language and that indicates qubits and their evolution. Herein, qubits, quantum logic gates, and the like related to quantum computation are all represented by corresponding classical code.

The quantum circuit, as an embodiment of the quantum program, is also referred to as a quantum logic circuit and is the most commonly used general quantum computation model. The quantum circuit means an operation applied to qubits from an abstract concept, and includes qubits, lines (timelines), and various quantum logic gates. Finally, a result usually needs to be read out through a quantum measurement operation. The quantum circuit may be presented as a quantum logic gate sequence arranged according to a specific execution time sequence.

Specifically, for example, a piece of quantum program is shown as follows:

QCircuitcir;
cir<<H(q[0])<<H(q[1])<<H(q[2])<<H(q[3])<<RZ(q[0], PI/2)<<RY(q[1],PI/4)<<RZ(q[2],PI/4)<<CNOT(q[0],q[1])<<CR(q[1],q[2],PI/3)<<CNOT(q[2],q[3])
<<CNOT(q[0],q[3]).

A corresponding quantum circuit (denoted as 1# quantum circuit) may be denoted as:
q[0]: H(q[0]), RZ(q[0], PI/2)
q[1]: H(q[1]), RY(q[1], PI/4), CNOT(q[0], q[1])
q[2]: H(q[2]), RZ(q[2], -PI/4), CR(q[1], q[2], PI/3)
q[3]: H(q[3]), CNOT(q[2], q[3]), CNOT(q[0], q[3])
where q[0], q[1], q[2], q[3] are qubits whose bits range from 0 to 3, and may also be generally denoted as $q_0$, $q_1$, $q_2$, and $q_3$.

Figure 1C:
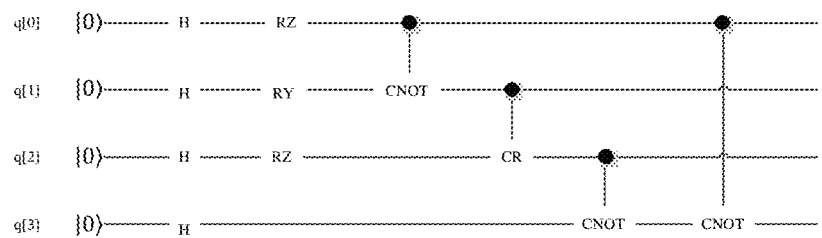
FIG. 1C is a schematic diagram of graphical display of a quantum circuit according to an embodiment of the present application.

In a more vivid presentation manner, a quantum circuit diagram corresponding to the foregoing quantum logic gate sequence is shown in FIG. 1C.

A conventional circuit is connected through metallic wires to transmit voltage signals or current signals. Different from the conventional circuit, a quantum circuit may be considered to be connected by time. To be specific, a state of a qubit evolves naturally with time. This process proceeds according to an instruction of the Hamiltonian operator until the qubit is operated by a quantum logic gate.

One quantum program as a whole corresponds to one total quantum circuit. The quantum program described in the present application indicates the total quantum circuit. A total number of qubits in the total quantum circuit is the same as a total number of qubits in the quantum program. It may be understood that one quantum program may include a quantum circuit, a measurement operation for qubits in the quantum circuit, a register for saving a measurement result, and a control flow node (a jump instruction), and one quantum circuit may include tens of or hundreds of or even thousands of quantum logic gate operations. An execution process of the quantum program is a process of executing all quantum logic gates in a specific time sequence. It should be noted that the time sequence is a sequence of time at which an individual quantum logic gate is executed.

It should be noted that in classical computation, the most basic unit is a bit, and the most basic control mode is a logic gate. A purpose of controlling a circuit may be achieved through a combination of logic gates. Similarly, a manner of processing the qubit is the quantum logic gate. The use of the quantum logic gate enables the evolution of a quantum state. The quantum logic gate is a base for forming the quantum circuit. The quantum logic gate includes: single-bit quantum logic gates (or single quantum logic gates, "single gates" for short) such as the Hadamard gate (H gate, Hadamard gate), the Pauli-X gate (X gate), the Pauli-Y gate (Y gate), the Pauli-Z gate (Z gate), the RX gate, the RY gate, and the RZ gate; two-bit quantum logic gates (or double quantum logic gates, "double gate" for short), such as the CNOT gate, the CR gate, the SWAP gate, the ISWAP gate; and multi-bit quantum logic gates (or multiple quantum logic gates, and "multiple gates" for short) such as the Toffoli gate. The quantum logic gate is generally represented by using a unitary matrix. The unitary matrix is not only a matrix form but also an operation and a transform. Generally, an action of the quantum logic gate on a quantum state is calculated by left multiplying a unitary matrix by a matrix corresponding to a quantum state ket.

For example, a vector corresponding to the right vector $|0\rangle$ of the quantum state is $$\begin{pmatrix} 1 \\ 0 \end{pmatrix},$$

and a vector corresponding to the right vector $|1\rangle$ of the quantum state is $$\begin{pmatrix} 0 \\ 1 \end{pmatrix}.$$

A quantum state is a logical state of a qubit. In a quantum algorithm (or a quantum program), a quantum state of a group of qubits included in a quantum circuit is represented in a binary manner. For example, a group of qubits $q_0$, $q_1$, and $q_2$ represent qubits in the order of the $0^{th}$ bit, the $1^{st}$ bit, and the $2^{nd}$ bit. In the binary representation manner, the qubits are ordered from the highest bit to the lowest bit as $q_2q_1q_0$. A number of quantum states corresponding to the group of qubits is 2 to the power of a total number of qubits, that is, eight eigenstates (determined states): $|000\rangle$, $|001\rangle$, $|010\rangle$, $|011\rangle$, $|100\rangle$, $|101\rangle$, $|110\rangle$, and $|111\rangle$. Bits of each quantum state are corresponding to qubits, for example, for the state $|001\rangle$, 001 are corresponding to $q_2q_1q_0$ from a high bit to a low bit, and $|\rangle$ is a Dirac notation. For a quantum circuit including N qubits $q_0, q_1, \ldots, q_n, \ldots, q_{N-1}$, a bit order of quantum states in the binary manner is $q_{N-1}q_{N-2}, \ldots, q_1q_0$.

A single qubit is used for description. A logical state $\psi$ of the single qubit may be in a state $|0\rangle$, a state $|1\rangle$, and a superposition state (an uncertain state) of the state $|0\rangle$ and the state $|1\rangle$, which may be specifically represented as $\psi=a|0\rangle+b|1\rangle$, where a and b are complex numbers representing amplitude (probability amplitude) of a quantum state. A square of a modulus of amplitude represents a probability, $a^2$ and $b^2$ respectively represent probabilities when the logical states are state $|0\rangle$ and state $|1\rangle$, and $|a|^2+|b|^2=1$. In short, quantum states are superposed states composed of eigenstates. When a probability of other states is 0, a qubit is in a uniquely determined eigenstate.

The following further describes a quantum computing task processing method according to an embodiment of the present application with reference to the accompanying drawings.

Figure 2A:
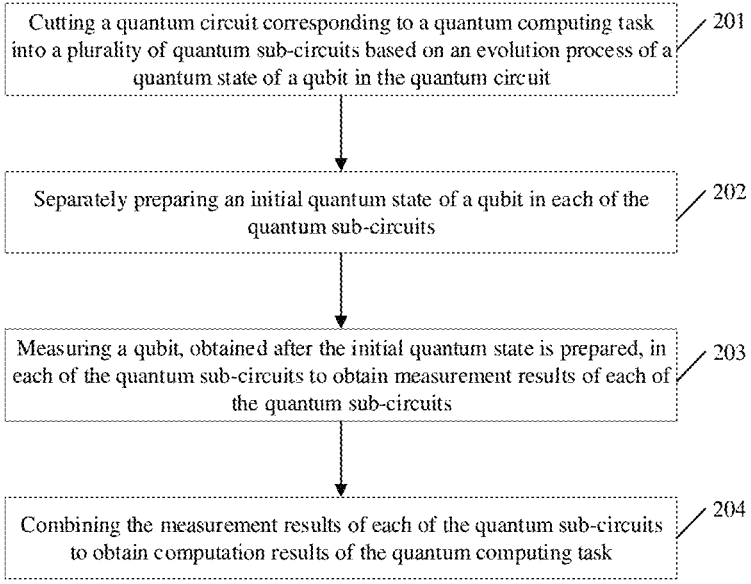
FIG. 2A is a schematic flowchart of a quantum computing task processing method according to an embodiment of the present application.

Referring to FIG. 2A, FIG. 2A is a schematic flowchart of a quantum computing task processing method according to an embodiment of the present application, and the method includes:

Step 201: cutting a quantum circuit corresponding to a quantum computing task into a plurality of quantum sub-circuits based on an evolution process of a quantum state of a qubit in the quantum circuit;

Step 202: separately preparing an initial quantum state of a qubit in each of the quantum sub-circuits;

Step 203: measuring a qubit, obtained after the initial quantum state is prepared, in each of the quantum sub-circuits, to obtain measurement results of each of the quantum sub-circuits; and Step 204: combining the measurement results of each of the quantum sub-circuits to obtain computation results of the quantum computing task.

Specifically, the quantum sub-circuit includes a first qubit and a second qubit, a timeline where the first qubit is located is not cut, and a timeline where the second qubit is located is cut. The separately preparing an initial quantum state of a qubit in each of the quantum sub-circuits includes:

preparing a first quantum state from an initial quantum state of the first qubit by using a first unitary matrix; and if the timeline where the second qubit is located is an upstream timeline obtained through cutting, preparing the first quantum state from an initial quantum state of the second qubit by using the first unitary matrix; if the timeline where the second qubit is located is a downstream timeline obtained through cutting, preparing a second quantum state from an initial quantum state of the second qubit by using a second unitary matrix, where the upstream timeline is a timeline located before a cutting position, and the downstream timeline is a timeline located after the cutting position.

The first quantum state is $|0\rangle$, the first unitary matrix is an identity matrix E, and $$E = \begin{pmatrix} 1 & 0 \\ 0 & 1 \end{pmatrix}.$$

The second quantum state $\overrightarrow{OS_0}$ is $|0\rangle$, and the second unitary matrix is an identity matrix E.

The second quantum state $\overrightarrow{OS_1}$ is $\frac{1}{\sqrt{3}}|0\rangle + \sqrt{\frac{2}{3}}|1\rangle$, and the second unitary matrix is $U_3\left(-2\arccos\frac{1}{\sqrt{3}}, \pi, 0\right);$ the second quantum state $\overrightarrow{OS_2}$ is $\frac{1}{\sqrt{3}}|0\rangle + \sqrt{\frac{2}{3}}e^{i\frac{2\pi}{3}}|1\rangle$, and the second unitary matrix is $U_3\left(-2\arccos\frac{1}{\sqrt{3}}, \pi/3, 0\right);$ and the second quantum state $\overrightarrow{OS_3}$ is $\frac{1}{\sqrt{3}}|0\rangle + \sqrt{\frac{2}{3}}e^{i\frac{4\pi}{3}}|1\rangle$, and the second unitary matrix is $U_3\left(-2\arccos\frac{1}{\sqrt{3}}, -\pi/3, 0\right),$ where $U_3(\theta, \varphi, \lambda) = \begin{pmatrix} \cos\left(\frac{\theta}{2}\right) & -e^{i\lambda} \times \sin\left(\frac{\theta}{2}\right) \\ e^{i\varphi} \times \sin\left(\frac{\theta}{2}\right) & e^{i\lambda+i\varphi} \times \cos\left(\frac{\theta}{2}\right) \end{pmatrix}.$ Specifically, the measuring a qubit, obtained after the initial quantum state is prepared, in each of the quantum sub-circuits, to obtain measurement results of each of the quantum sub-circuits includes:
    measuring, on a first measurement basis, a final quantum state of the first qubit obtained after the quantum sub-circuits are run; and if the timeline where the second qubit is located is a downstream timeline located after the cutting position, measuring, on the first measurement basis, a final quantum state of the second qubit obtained after the quantum sub-circuits are run; if the timeline where the second qubit is located is an upstream timeline located after the cutting position, measuring, on a second measurement basis, a final quantum state of the second qubit obtained after the quantum sub-circuits are run.

Figure 2B:
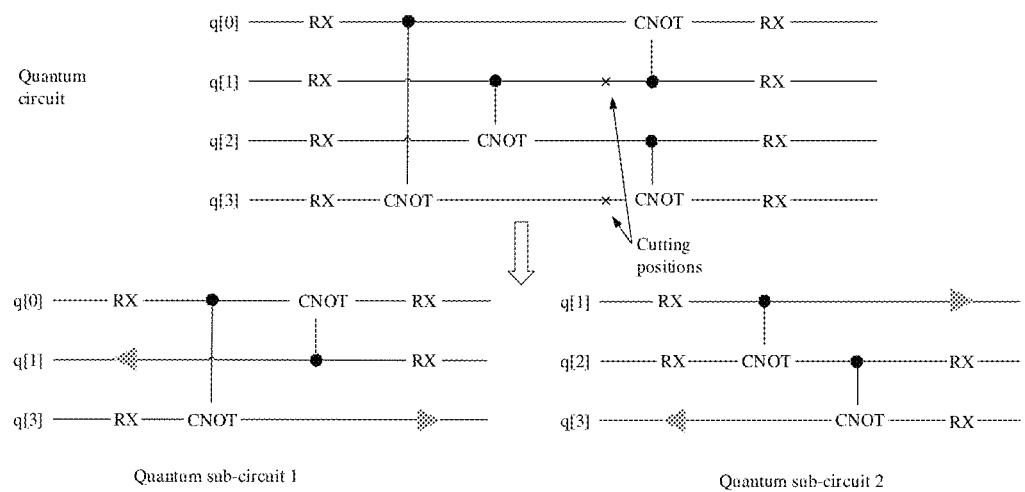
FIG. 2B is a schematic diagram of a process of cutting a quantum circuit into quantum sub-circuits according to an embodiment of the present application.

The first measurement basis is Z, and the second measurement basis is Z, X, and Y,
    where $X = \begin{pmatrix} 0 & 1 \\ 1 & 0 \end{pmatrix}, Y = \begin{pmatrix} 0 & -i \\ i & 0 \end{pmatrix}, \text{ and } Z = \begin{pmatrix} 1 & 0 \\ 0 & -1 \end{pmatrix}.$ The final measurement state is a Pauli feature state, a Pauli feature state corresponding to Z is $Z_p = \begin{pmatrix} 1 \\ 0 \end{pmatrix} \text{ or } Z_m = \begin{pmatrix} 0 \\ 1 \end{pmatrix},$ a Pauli feature state corresponding to X is $X_p = \frac{1}{\sqrt{2}}\begin{pmatrix} 1 \\ 1 \end{pmatrix} \text{ or } X_m = \frac{1}{\sqrt{2}}\begin{pmatrix} 1 \\ -1 \end{pmatrix},$ and a Pauli feature state corresponding to Y is $Y_p = \frac{1}{\sqrt{2}}\begin{pmatrix} 1 \\ i \end{pmatrix} \text{ or } Y_m = \frac{1}{\sqrt{2}}\begin{pmatrix} 1 \\ -i \end{pmatrix}.$ A shown in FIG. 2B, FIG. 2B is a schematic diagram of a process of cutting a quantum circuit into quantum sub-circuits according to an embodiment of the present application. An original quantum circuit is cut into two quantum sub-circuits: a quantum sub-circuit 1 and a quantum sub-circuit 2 at two illustrated cutting positions. Timelines on which qubits q[1] and q[3] in the original quantum sub-circuits are located are cut, and timelines on which qubits q[0] and q[2] are located are not cut. An arrow pointing left represents that a qubit here needs to be prepared from an initial quantum state to a second quantum state, and an arrow pointing right represents that a final quantum state of a qubit here needs to be measured on a second measurement basis.

It may be learned that in this embodiment of the present application, a quantum circuit corresponding to a quantum computing task is cut into a plurality of quantum sub-circuits based on an evolution process of a quantum state of a qubit in the quantum circuit; an initial quantum state of a qubit in each of the quantum sub-circuits is prepared separately; a qubit, obtained after the initial quantum state is prepared, in each of the quantum sub-circuits is measured to obtain measurement results of each of the quantum sub-circuits; and the measurement results of each of the quantum sub-circuits are combined to obtain computation results of the quantum computing task. Initial quantum state preparation of each quantum sub-circuit is implemented, so that each quantum sub-circuit may run independently on different devices. The quantum sub-circuit may run independently, and therefore, a qubit of each quantum sub-circuit may be separately measured to obtain measurement results. Finally, the measurement results of each quantum sub-circuit are combined, thereby implementing distributed computing of the quantum computing task.

In an embodiment of the present application, the combining the measurement results of each of the quantum sub-circuits to obtain computation results of the quantum computing task includes:

determining a density matrix corresponding to the measurement results of each of the quantum sub-circuits;

combining, based on a tensor contraction method, density matrices corresponding to measurement results of the plurality of quantum sub-circuits to obtain a density matrix corresponding to measurement results of the quantum circuit; and determining the density matrix corresponding to the measurement results of the quantum circuit as the computation results of the quantum computing task.

For example, measurement results of the quantum sub-circuit 1 are as follows: a density matrix $\Lambda1(00)$ corresponding to state $|00\rangle$, a density matrix $\Lambda1(01)$ corresponding to state $|01\rangle$, a density matrix $\Lambda1(10)$ corresponding to state $|10\rangle$, and a density matrix $\Lambda1(11)$ corresponding to state $|11\rangle$.

Measurement results of the quantum sub-circuit 2 are as follows: a density matrix $\Lambda2(00)$ corresponding to state $|00\rangle$, a density matrix $\Lambda2(01)$ corresponding to state $|01\rangle$, a density matrix $\Lambda2(10)$ corresponding to state $|10\rangle$, and a density matrix $\Lambda2(11)$ corresponding to state $|11\rangle$.

Each of $\Lambda1(00)$, $\Lambda1(01)$, $\Lambda1(10)$, $\Lambda1(11)$, $\Lambda2(00)$, $\Lambda2(01)$, $\Lambda2(10)$, and $\Lambda2(11)$ is a 4×4 complex matrix.

Based on the tensor contraction method, $\Lambda1(00)$ and $\Lambda2(00)$ may be combined to obtain $\Lambda(00)$, and $\Lambda(00)$ indicates the first quantum state of an original quantum sub-circuit; $\Lambda1(01)$ and $\Lambda2(01)$ may be combined to obtain $\Lambda(01)$, and $\Lambda(01)$ indicates the second quantum state of the original quantum sub-circuit; $\Lambda1(10)$ and $\Lambda2(10)$ may be combined to obtain $\Lambda(10)$, and $\Lambda(10)$ indicates the third quantum state of the original quantum sub-circuit; and $\Lambda1(11)$ and $\Lambda2(11)$ may be combined to obtain $\Lambda(11)$, and $\Lambda(11)$ indicates the fourth quantum state of the original quantum sub-circuit. $\Lambda(00)$, $\Lambda(01)$, $\Lambda(10)$, and $\Lambda(11)$ are results of the quantum computing task.

In an embodiment of the present application, before the combining, based on a tensor contraction method, density matrices corresponding to measurement results of the plurality of quantum sub-circuits to obtain a density matrix corresponding to measurement results of the quantum circuit, the method further includes:

determining a qubit included in each of the quantum sub-circuits;

if a timeline where the qubit is located is not cut, determining an input node corresponding to the qubit as a classical input node, and determining an output node corresponding to the qubit as a classical output node;

if a timeline where the qubit is located is an upstream timeline obtained through cutting, determining an input node corresponding to the qubit as the classical input node, and determining an output node corresponding to the qubit as a quantum output node;

if a timeline where the qubit is located is a downstream timeline obtained through cutting, determining an input node corresponding to the qubit as a quantum input node, and determining an output node corresponding to the qubit as the classical output node; and determining, based on the classical input node, the classical output node, the quantum input node, and the quantum output node, an input node and an output node of a density matrix corresponding to the measurement results of each of the quantum sub-circuits.

As shown in FIG. 2B, for the quantum sub-circuit 1, an input node corresponding to q[0] is a classical input node, denoted by $C_{i0}$, and an output node is a classical output node, denoted by $C_{o0}$; an input node corresponding to q[1] is a quantum input node, denoted by $Q_{i1}$, and an output node is a classical output node, denoted by $C_{o1}$; and an input node corresponding to q[3] is a classical input node, denoted by $C_{i3}$, and an output node is a quantum output node, denoted by $Q_{o3}$. A density matrix corresponding to the quantum sub-circuit 1 is as follows:

$$\Lambda1_{C_{o0}C_{o1}Q_{o3}}{}^{C_{i0}Q_{i1}C_{i3}}$$

where initial quantum states of q[0] and q[3] have been determined, and output states of q[0] and q[1] have also been determined as state 0 or state 1. Therefore, a density matrix corresponding to the quantum sub-circuit 1 is as follows:

$$\Lambda1_{Q_{o3}}{}^{Q_{i1}}$$

For the quantum sub-circuit 2, an input node corresponding to q[1] is a classical input node, denoted by $C_{i1}$, and an output node is a quantum output node, denoted by $Q_{o1}$; an input node corresponding to q[2] is a classical input node, denoted by $C_{i2}$, and an output node is a classical output node, denoted by $C_{o2}$; and an input node corresponding to q[3] is a quantum input node, denoted by $Q_{i3}$, and an output node is a classical output node, denoted by $C_{o3}$. A density matrix corresponding to the quantum sub-circuit 2 is as follows:

$$\Lambda2_{Q_{o1}C_{o2}C_{o3}}{}^{C_{i1}C_{i2}Q_{i3}}$$

where initial quantum states of q[1] and q[2] have been determined, and output states of q[2] and q[3] have also been determined as state 0 or state 1. Therefore, a density matrix corresponding to the quantum sub-circuit 2 is as follows:

$$\Lambda2_{Q_{o1}}{}^{Q_{i3}}$$

In an embodiment of the present application, the tensor contraction method includes:

if an output node of a density matrix I is equal to an input node of a density matrix J, combining the density matrix I and the density matrix J to obtain a density matrix K, where an input node of the density matrix K is the same as an input node of the density matrix I, and an output node of the density matrix K is the same as an output node of the density matrix J.

For example, it is assumed that an input node of I is i, an output node thereof is j, denoted by $I_j{}^i$; and an input node of J is j, an output node thereof is k, denoted by $J_k{}^j$. In this case, $$I_j{}^i J_k{}^j = K_k{}^i$$

A density matrix corresponding to the quantum sub-circuit 1 and the quantum sub-circuit 2 is as follows:

$$\Lambda1_{Q_{o3}}{}^{Q_{i1}} \Lambda2_{Q_{o1}}{}^{Q_{i3}} = \Lambda_{Q_{o1}}{}^{Q_{i1}} = \Lambda$$

where $\Lambda$ is a real number.

Therefore, for $\Lambda1(00)$, $\Lambda1(01)$, $\Lambda1(10)$, $\Lambda1(11)$, $\Lambda2(00)$, $\Lambda2(01)$, $\Lambda2(10)$, and $\Lambda2(11)$, $\Lambda1(00)$ and $\Lambda2(00)$ may be combined to obtain $\Lambda(00)$, and $\Lambda(00)$ indicates the first quantum state of an original quantum sub-circuit; $\Lambda1(01)$ and $\Lambda2(01)$ may be combined to obtain $\Lambda(01)$, and $\Lambda(01)$ indicates the second quantum state of the original quantum sub-circuit; $\Lambda1(10)$ and $\Lambda2(10)$ may be combined to obtain $\Lambda(10)$, and $\Lambda(10)$ indicates the third quantum state of the original quantum sub-circuit; and $\Lambda1(11)$ and $\Lambda2(11)$ may be combined to obtain $\Lambda(11)$, and $\Lambda(11)$ indicates the fourth quantum state of the original quantum sub-circuit.

In an embodiment of the present application, the cutting a quantum circuit corresponding to a quantum computing task into a plurality of quantum sub-circuits based on an evolution process of a quantum state of a qubit in the quantum circuit includes:

determining, based on a computing resource currently allowed to be used by an electronic device and the evolution process of a quantum state of a qubit in the quantum circuit, a cutting position of the quantum circuit corresponding to the quantum computing task; and cutting the quantum circuit into the plurality of quantum sub-circuits based on the cutting position.

In an embodiment of the present application, the computing resource includes a qubit, and the determining, based on a computing resource currently allowed to be used by an electronic device and the evolution process of a quantum state of a qubit in the quantum circuit, a cutting position of the quantum circuit corresponding to the quantum computing task includes:

acquiring a connected graph of the quantum circuit corresponding to the quantum computing task, and using a number of qubits currently allowed to be used by the electronic device as a maximum number of qubits allowed to be used by a quantum sub-circuit obtained after the quantum circuit is cut;

determining a first cut position of the connected graph based on the maximum number of qubits;

determining two quantum logic gates corresponding to the first cut position in the quantum circuit; and using, as the cutting position, a change in a same qubit acted on by the two quantum logic gates from a quantum state evolution corresponding to an action of one quantum logic gate to a quantum state evolution corresponding to an action of the other quantum logic gate.

A vertex of the connected graph is used to represent a quantum logic gate in the quantum circuit, and a directed edge of the connected graph is used to represent a dependency relationship of the quantum logic gate in an evolution time sequence of a quantum state of a qubit.

Specifically, if the electronic device includes a plurality of computing modules, the using a number of qubits currently allowed to be used by the electronic device as a maximum number of qubits allowed to be used by a quantum sub-circuit obtained after the quantum circuit is cut includes:

determining a number n of qubits used by the quantum circuit;

determining m target computing modules from the plurality of computing modules, where a sum of the number of qubits currently allowed to be used by the m target computing modules is greater than or equal to n;

using a number of qubits currently allowed to be used by the $i^{th}$ target computing module as a maximum number of qubits allowed to be used by the $i^{th}$ quantum sub-circuit after the quantum circuit is cut, where the $i^{th}$ target computing module is any one of the m target computing modules.

Specifically, the determining a first cut position of the connected graph based on the maximum number of qubits includes:

obtaining $q_i$ consecutive vertexes from the vertexes of the connected graph, and using the $q_i$ consecutive vertexes as vertexes of the $i^{th}$ connected sub-graph, where a number of qubits included in the $q_i$ consecutive vertexes is equal to a number of qubits currently allowed to be used by the $i^{th}$ target computing module;

using any point on a directed edge between the vertex included in the $i^{th}$ connected sub-graph and a vertex, in the connected graph, other than the vertex included in the $i^{th}$ connected sub-graph as the first cut position of the connected graph;

deleting the $i^{th}$ connected sub-graph to obtain a new connected graph; and setting i=i+1, and then performing the step of obtaining $q_i$ consecutive vertexes from the vertexes of the connected graph, and using the $q_i$ consecutive vertexes as the vertexes of the $i^{th}$ connected sub-graph until all first cut points are determined.

In an embodiment of the present application, the cutting a quantum circuit corresponding to a quantum computing task into a plurality of quantum sub-circuits based on an evolution process of a quantum state of a qubit in the quantum circuit includes:

determining, based on a greedy algorithm and the evolution process of a quantum state of a qubit in the quantum circuit, a cutting position of the quantum circuit corresponding to the quantum computing task; and cutting the quantum circuit into the plurality of quantum sub-circuits based on the cutting position.

It should be noted that, for a specific implementation of determining, based on a greedy algorithm and the evolution process of a quantum state of a qubit in the quantum circuit, a cutting position of the quantum circuit corresponding to the quantum computing task, reference can be made to the foregoing specific implementation of determining, based on a computing resource currently allowed to be used by an electronic device and the evolution process of a quantum state of a qubit in the quantum circuit, a cutting position of the quantum circuit corresponding to the quantum computing task. In the greedy algorithm, vertexes of each connected sub-graph include a same number of qubits, which is equal to a preset number of qubits and independent of a number of qubits currently allowed to be used by a specific electronic device.

Figure 3:
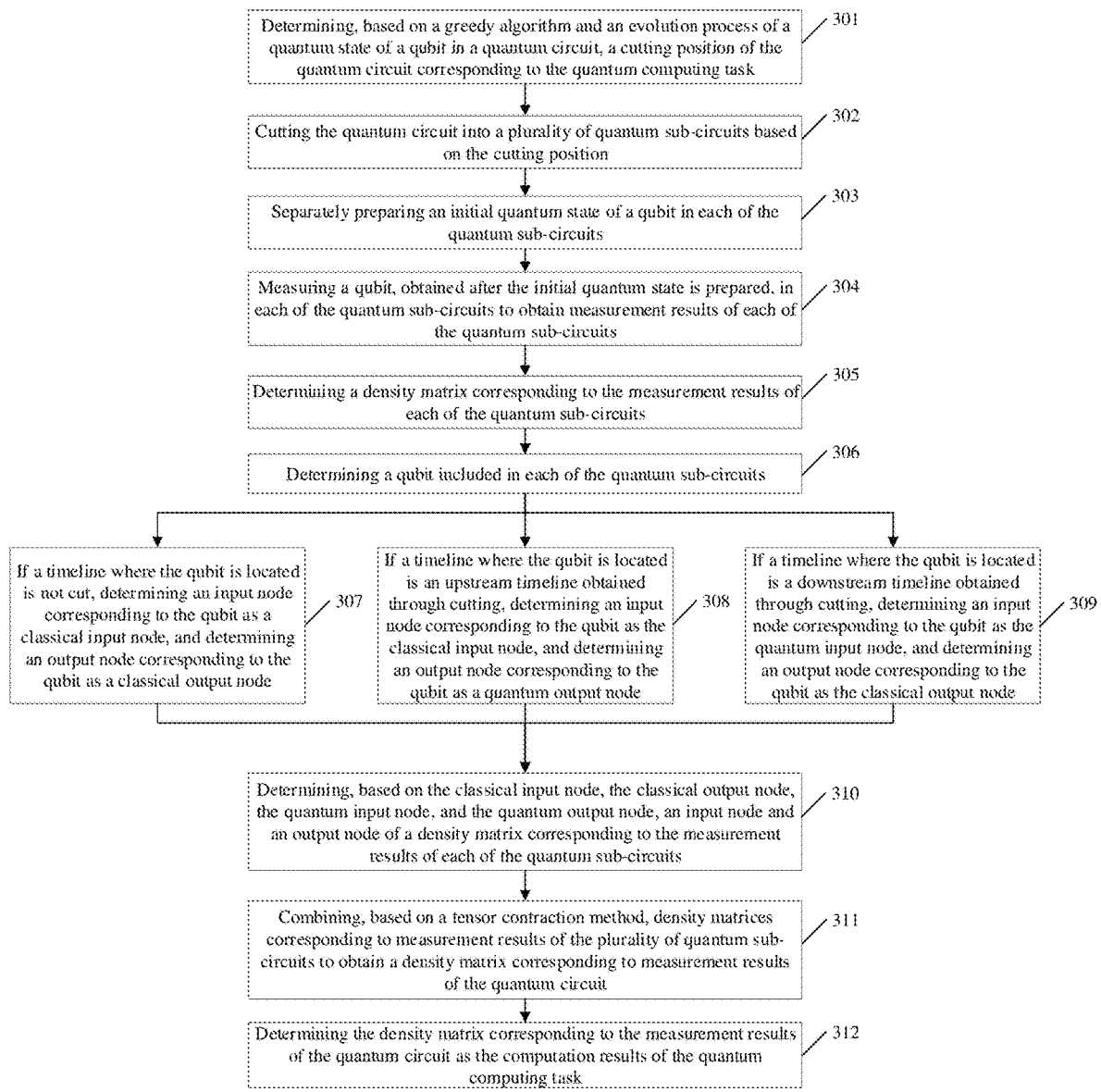
FIG. 3 is a schematic flowchart of another quantum computing task processing method according to an embodiment of the present application.

Referring to FIG. 3, FIG. 3 is a schematic flowchart of another quantum computing task processing method according to an embodiment of the present application, and the method includes following steps:

Step 301: determining, based on a greedy algorithm and an evolution process of a quantum state of a qubit in a quantum circuit, a cutting position of the quantum circuit corresponding to a quantum computing task;

Step 302: cutting the quantum circuit into a plurality of quantum sub-circuits based on the cutting position;

Step 303: separately preparing an initial quantum state of a qubit in each of the quantum sub-circuits;

Step 304: measuring a qubit, obtained after the initial quantum state is prepared, in each of the quantum sub-circuits, to obtain measurement results of each of the quantum sub-circuits;

Step 305: determining a density matrix corresponding to the measurement results of each of the quantum sub-circuits;

Step 306: determining a qubit included in each of the quantum sub-circuits;

Step 307: if a timeline where the qubit is located is not cut, determining an input node corresponding to the qubit as a classical input node, and determining an output node corresponding to the qubit as a classical output node;

Step 308: if a timeline where the qubit is located is an upstream timeline obtained through cutting, determining an input node corresponding to the qubit as the classical input node, and determining an output node corresponding to the qubit as a quantum output node;

Step 309: if a timeline where the qubit is located is a downstream timeline obtained through cutting, determining an input node corresponding to the qubit as a quantum input node, and determining an output node corresponding to the qubit as the classical output node;

Step 310: determining, based on the classical input node, the classical output node, the quantum input node, and the quantum output node, an input node and an output node of a density matrix corresponding to the measurement results of each of the quantum sub-circuits;

Step 311: combining, based on a tensor contraction method, density matrices corresponding to measurement results of the plurality of quantum sub-circuits to obtain a density matrix corresponding to measurement results of the quantum circuit, where the tensor contraction method includes: if an output node of a density matrix I is equal to an input node of a density matrix J, combining the density matrix I and the density matrix J to obtain a density matrix K, where an input node of the density matrix K is the same as an input node of the density matrix I, and an output node of the density matrix K is the same as an output node of the density matrix J; and Step 312: determining the density matrix corresponding to the measurement results of the quantum circuit as the computation results of the quantum computing task.

It should be noted that, for a specific implementation process of this embodiment, reference may be made to the specific implementation process described in foregoing method embodiments. Details are not described herein again.

Figure 4:
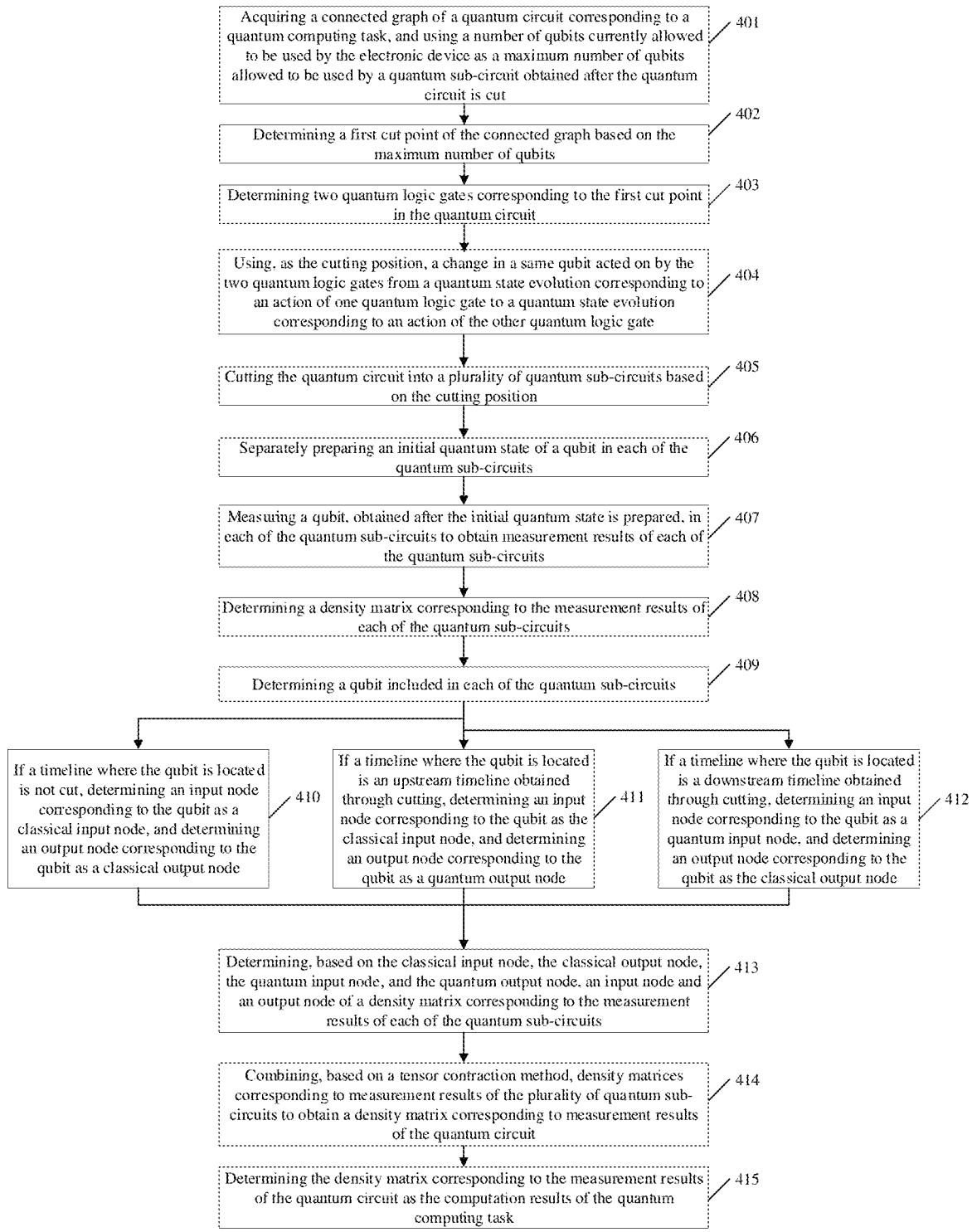
FIG. 4 is a schematic flowchart of still another quantum computing task processing method according to an embodiment of the present application.

Referring to FIG. 4, FIG. 4 is a schematic flowchart of another quantum computing task processing method according to an embodiment of the present application, and the method includes following steps:

Step 401: acquiring a connected graph of a quantum circuit corresponding to a quantum computing task, and using a number of qubits currently allowed to be used by an electronic device as a maximum number of qubits allowed to be used by a quantum sub-circuit obtained after the quantum circuit is cut;

Step 402: determining a first cut position of the connected graph based on the maximum number of qubits;

Step 403: determining two quantum logic gates corresponding to the first cut position in the quantum circuit;

Step 404: using, as the cutting position, a change in a same qubit acted on by the two quantum logic gates from a quantum state evolution corresponding to an action of one quantum logic gate to a quantum state evolution corresponding to an action of the other quantum logic gate;

Step 405: cutting the quantum circuit into a plurality of quantum sub-circuits based on the cutting position;

Step 406: separately preparing an initial quantum state of a qubit in each of the quantum sub-circuits;

Step 407: measuring a qubit, obtained after the initial quantum state is prepared, in each of the quantum sub-circuits, to obtain measurement results of each of the quantum sub-circuits;

Step 408: determining a density matrix corresponding to the measurement results of each of the quantum sub-circuits;

Step 409: determining a qubit included in each of the quantum sub-circuits;

Step 410: if a timeline where the qubit is located is not cut, determining an input node corresponding to the qubit as a classical input node, and determining an output node corresponding to the qubit as a classical output node;

Step 411: if a timeline where the qubit is located is an upstream timeline obtained through cutting, determining an input node corresponding to the qubit as the classical input node, and determining an output node corresponding to the qubit as a quantum output node;

Step 412: if a timeline where the qubit is located is a downstream timeline obtained through cutting, determining an input node corresponding to the qubit as a quantum input node, and determining an output node corresponding to the qubit as the classical output node;

Step 413: determining, based on the classical input node, the classical output node, the quantum input node, and the quantum output node, an input node and an output node of a density matrix corresponding to the measurement results of each of the quantum sub-circuits;

Step 414: combining, based on a tensor contraction method, density matrices corresponding to measurement results of the plurality of quantum sub-circuits to obtain a density matrix corresponding to measurement results of the quantum circuit, where the tensor contraction method includes: if an output node of a density matrix I is equal to an input node of a density matrix J, combining the density matrix I and the density matrix J to obtain a density matrix K, where an input node of the density matrix K is the same as an input node of the density matrix I, and an output node of the density matrix K is the same as an output node of the density matrix J; and Step 415: determining the density matrix corresponding to the measurement results of the quantum circuit as the computation results of the quantum computing task.

It should be noted that, for a specific implementation process of this embodiment, reference may be made to the specific implementation process described in foregoing method embodiments. Details are not described herein again.

Figure 5:
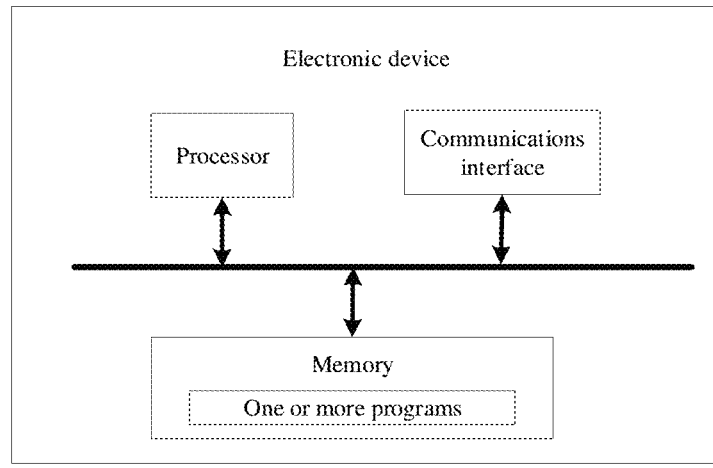
FIG. 5 is a schematic structural diagram of an electronic device according to an embodiment of the present application.

With Consistency with the foregoing embodiments illustrated in FIG. 2A, FIG. 3, and FIG. 4, reference can be made to FIG. 5. FIG. 5 is a schematic structural diagram of an electronic device according to an embodiment of the present application. As shown in FIG. 5, the electronic device includes a processor, a memory, a communications interface, and one or more programs. The one or more programs are stored in the memory, and are configured to be executed by the processor. The program includes instructions used to execute the following steps: cutting a quantum circuit corresponding to a quantum computing task into a plurality of quantum sub-circuits based on an evolution process of a quantum state of a qubit in the quantum circuit; separately preparing an initial quantum state of a qubit in each of the quantum sub-circuits; measuring a qubit, obtained after the initial quantum state is prepared, in each of the quantum sub-circuits to obtain measurement results of each of the quantum sub-circuits; and combining the measurement results of each of the quantum sub-circuits to obtain computation results of the quantum computing task.

In an embodiment of the present application, in terms of the combining the measurement results of each of the quantum sub-circuits to obtain computation results of the quantum computing task, the program specifically includes instructions used to execute the following steps: determining a density matrix corresponding to the measurement results of each of the quantum sub-circuits; combining, based on a tensor contraction method, density matrices corresponding to measurement results of the plurality of quantum sub-circuits to obtain a density matrix corresponding to measurement results of the quantum circuit; and determining the density matrix corresponding to the measurement results of the quantum circuit as the computation results of the quantum computing task.

In an embodiment of the present application, the tensor contraction method includes: if an output node of a density matrix I is equal to an input node of a density matrix J, combining the density matrix I and the density matrix J to obtain a density matrix K, where an input node of the density matrix K is the same as an input node of the density matrix I, and an output node of the density matrix K is the same as an output node of the density matrix J.

In an embodiment of the present application, before the combining, based on a tensor contraction method, density matrices corresponding to measurement results of the plurality of quantum sub-circuits to obtain a density matrix corresponding to measurement results of the quantum circuit, the program further includes instructions used to execute the following steps: determining a qubit included in each of the quantum sub-circuits; if a timeline where the qubit is located is not cut, determining an input node corresponding to the qubit as a classical input node, and determining an output node corresponding to the qubit as a classical output node; if a timeline where the qubit is located is an upstream timeline obtained through cutting, determine an input node corresponding to the qubit as the classical input node, and determine an output node corresponding to the qubit as a quantum output node; if a timeline where the qubit is located is a downstream timeline obtained through cutting, determining an input node corresponding to the qubit as a quantum input node, and determining an output node corresponding to the qubit as the classical output node; and determining, based on the classical input node, the classical output node, the quantum input node, and the quantum output node, an input node and an output node of a density matrix corresponding to the measurement results of each of the quantum sub-circuits.

In an embodiment of the present application, in terms of the cutting a quantum circuit corresponding to a quantum computing task into a plurality of quantum sub-circuits based on an evolution process of a quantum state of a qubit in the quantum circuit, the program specifically includes instructions used to execute the following steps: determining, based on a greedy algorithm and the evolution process of a quantum state of a qubit in the quantum circuit, a cutting position of the quantum circuit corresponding to the quantum computing task; and cutting the quantum circuit into the plurality of quantum sub-circuits based on the cutting position.

In an embodiment of the present application, in terms of the cutting a quantum circuit corresponding to a quantum computing task into a plurality of quantum sub-circuits based on an evolution process of a quantum state of a qubit in the quantum circuit, the program specifically includes instructions used to execute the following steps: determining, based on a computing resource currently allowed to be used by an electronic device and the evolution process of a quantum state of a qubit in the quantum circuit, a cutting position of the quantum circuit corresponding to the quantum computing task; and cutting the quantum circuit into the plurality of quantum sub-circuits based on the cutting position.

In an embodiment of the present application, the computing resource includes a qubit, and in terms of the determining, based on a computing resource currently allowed to be used by an electronic device and the evolution process of a quantum state of a qubit in the quantum circuit, a cutting position of the quantum circuit corresponding to the quantum computing task, the program specifically includes instructions used to execute the following steps: acquiring a connected graph of the quantum circuit corresponding to the quantum computing task, and using a number of qubits currently allowed to be used by the electronic device as a maximum number of qubits allowed to be used by a quantum sub-circuit obtained after the quantum circuit is cut; determining a first cut position of the connected graph based on the maximum number of qubits; determining two quantum logic gates corresponding to the first cut position in the quantum circuit; and using, as the cutting position, a change in a same qubit acted on by the two quantum logic gates from a quantum state evolution corresponding to an action of one quantum logic gate to a quantum state evolution corresponding to an action of the other quantum logic gate.

It should be noted that, for a specific implementation process of this embodiment, reference may be made to the specific implementation process described in foregoing method embodiments. Details are not described herein again.

In this embodiment of the present application, the electronic device may be divided into functional units according to method examples. For example, each functional unit may be obtained through division corresponding to each function, or two or more functions may be integrated into one processing unit. The integrated unit may be implemented in a form of hardware, or may be implemented in a form of a software functional unit. It should be noted that unit division in the embodiment of the present application is an example, and is merely logical function division. In actual implementation, there may be another division manner.

Figure 6:
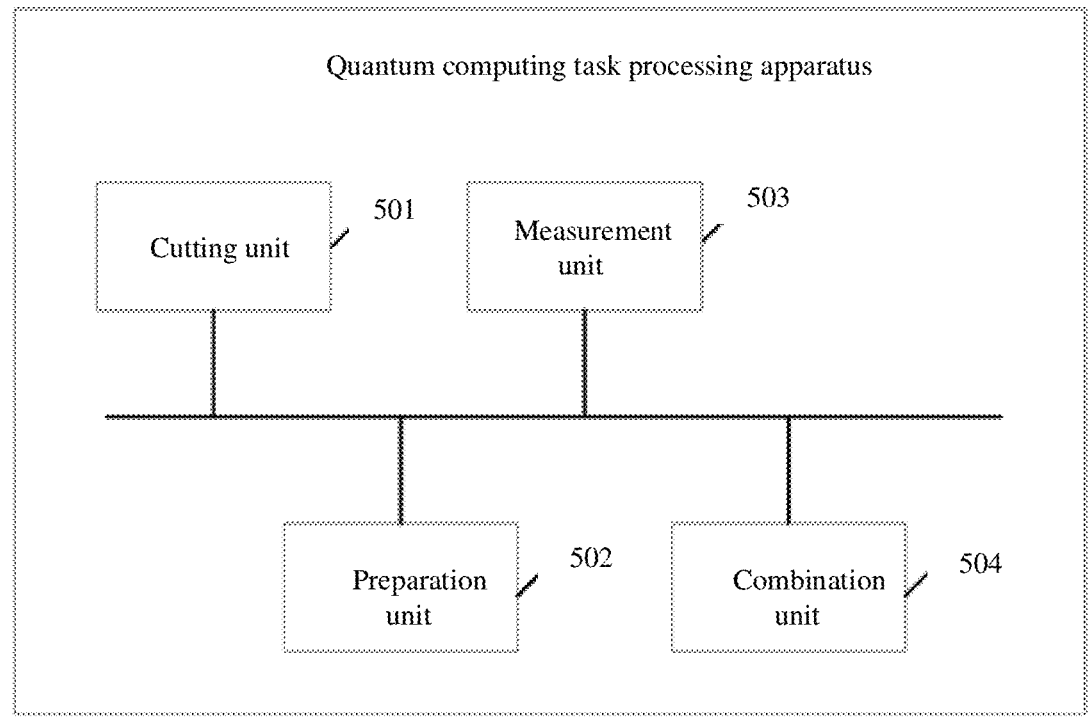
FIG. 6 is a schematic structural diagram of a quantum computing task processing apparatus according to an embodiment of the present application.

The following are apparatus embodiments of the present application. The apparatus embodiments of the present application are used to execute methods implemented in method embodiments of the present application. Referring to FIG. 6, FIG. 6 is a schematic structural diagram of a quantum computing task processing apparatus according to an embodiment of the present application, and the apparatus includes: a cutting unit 501, configured to cut a quantum circuit corresponding to a quantum computing task into a plurality of quantum sub-circuits based on an evolution process of a quantum state of a qubit in the quantum circuit; a preparation unit 502, configured to separately prepare an initial quantum state of a qubit in each of the quantum sub-circuits; a measurement unit 503, configured to measure a qubit, obtained after the initial quantum state is prepared, in each of the quantum sub-circuits, to obtain measurement results of each of the quantum sub-circuits; and a combination unit 504, configured to combine the measurement results of each of the quantum sub-circuits to obtain computation results of the quantum computing task.

In an embodiment of the present application, in terms of combining the measurement results of each of the quantum sub-circuits to obtain computation results of the quantum computing task, the combination unit 504 is configured to: determine a density matrix corresponding to the measurement results of each of the quantum sub-circuits; combine, based on a tensor contraction method, density matrices corresponding to measurement results of the plurality of quantum sub-circuits to obtain a density matrix corresponding to measurement results of the quantum circuit; and determine the density matrix corresponding to the measurement results of the quantum circuit as the computation results of the quantum computing task.

In an embodiment of the present application, the tensor contraction method includes: if an output node of a density matrix I is equal to an input node of a density matrix J, combining the density matrix I and the density matrix J to obtain a density matrix K, where an input node of the density matrix K is the same as an input node of the density matrix I, and an output node of the density matrix K is the same as an output node of the density matrix J.

In an embodiment of the present application, before the combining, based on a tensor contraction method, density matrices corresponding to measurement results of the plurality of quantum sub-circuits to obtain a density matrix corresponding to measurement results of the quantum circuit, the combination unit 504 is further configured to: determine a qubit included in each of the quantum sub-circuits; if a timeline where the qubit is located is not cut, determine an input node corresponding to the qubit as a classical input node, and determine an output node corresponding to the qubit as a classical output node; if a timeline where the qubit is located is an upstream timeline obtained through cutting, determine an input node corresponding to the qubit as the classical input node, and determine an output node corresponding to the qubit as a quantum output node; if a timeline where the qubit is located is a downstream timeline obtained through cutting, determine an input node corresponding to the qubit as a quantum input node, and determine an output node corresponding to the qubit as the classical output node; and determine, based on the classical input node, the classical output node, the quantum input node, and the quantum output node, an input node and an output node of a density matrix corresponding to the measurement results of each of the quantum sub-circuits.

In an embodiment of the present application, in terms of cutting a quantum circuit corresponding to a quantum computing task into a plurality of quantum sub-circuits based on an evolution process of a quantum state of a qubit in the quantum circuit, the cutting unit 501 is configured to: determine, based on a greedy algorithm and the evolution process of a quantum state of a qubit in the quantum circuit, a cutting position of the quantum circuit corresponding to the quantum computing task; and cut the quantum circuit into the plurality of quantum sub-circuits based on the cutting position.

In an embodiment of the present application, in terms of cutting a quantum circuit corresponding to a quantum computing task into a plurality of quantum sub-circuits based on an evolution process of a quantum state of a qubit in the quantum circuit, the cutting unit 501 is configured to: determine, based on a computing resource currently allowed to be used by an electronic device and the evolution process of a quantum state of a qubit in the quantum circuit, a cutting position of the quantum circuit corresponding to the quantum computing task; and cut the quantum circuit into the plurality of quantum sub-circuits based on the cutting position.

In an embodiment of the present application, the computing resource includes a qubit, and in terms of the determining, based on a computing resource currently allowed to be used by an electronic device and the evolution process of a quantum state of a qubit in the quantum circuit, a cutting position of the quantum circuit corresponding to the quantum computing task, the cutting unit 501 is configured to: acquire a connected graph of the quantum circuit corresponding to the quantum computing task, and use a number of qubits currently allowed to be used by the electronic device as a maximum number of qubits allowed to be used by a quantum sub-circuit obtained after the quantum circuit is cut; determine a first cut position of the connected graph based on the maximum number of qubits; determine two quantum logic gates corresponding to the first cut position in the quantum circuit; and use, as the cutting position, a change in a same qubit acted on by the two quantum logic gates from a quantum state evolution corresponding to an action of one quantum logic gate to a quantum state evolution corresponding to an action of the other quantum logic gate.

It should be noted that the cutting unit 501, the preparation unit 502, the measurement unit 503, and the combination unit 504 may be implemented by using a processor.

Figure 7:
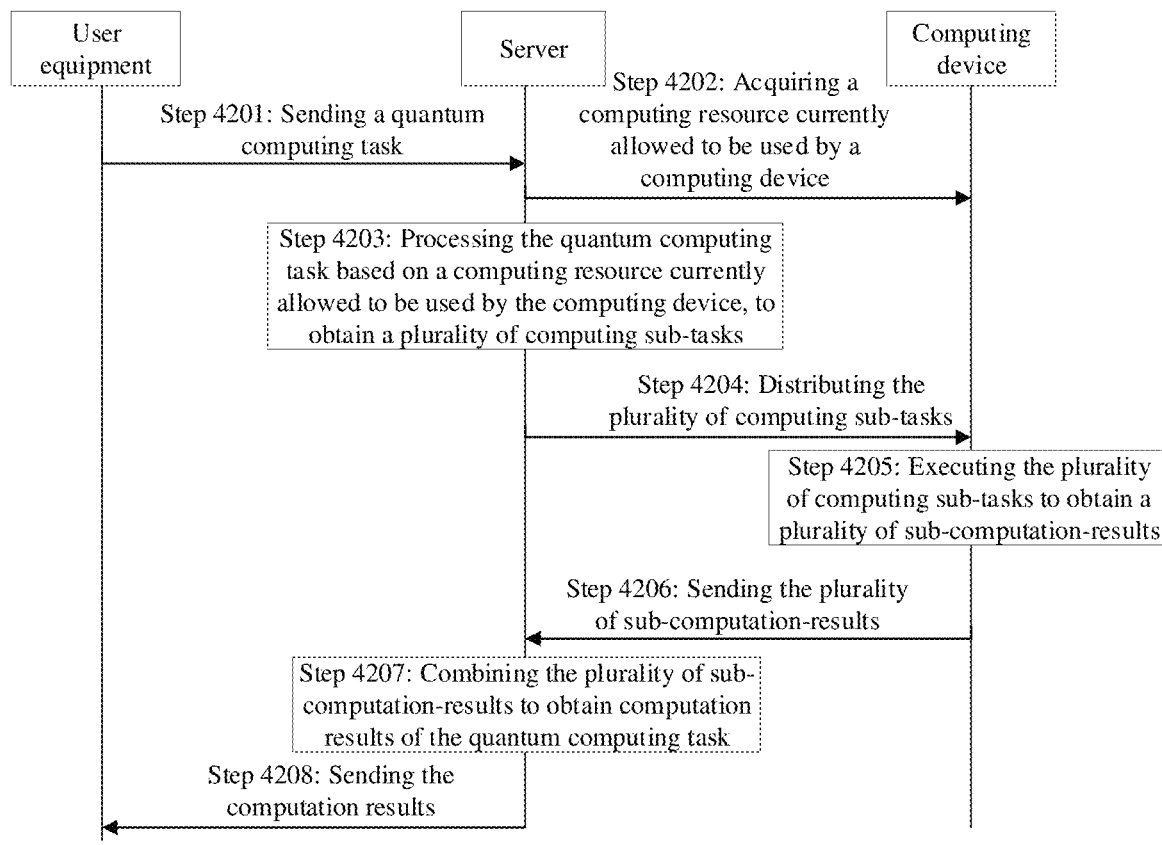
FIG. 7 is a schematic flowchart of a quantum computing task processing method according to an embodiment of the present application.

Referring to FIG. 7, FIG. 7 is a schematic flowchart of a quantum computing task processing method according to an embodiment of the present application, applied to a distributed quantum computing system, where the distributed quantum computing system includes a server and a computing device, and the method includes:

receiving, by the server, a quantum computing task sent by a user equipment;

processing, by the server, the quantum computing task based on a computing resource currently allowed to be used by the computing device, to obtain a plurality of computing sub-tasks, and distributing the plurality of computing sub-tasks to the computing device;

receiving, by the server, a plurality of sub-computation-results returned by the computing device for the plurality of computing sub-tasks, and combining the plurality of sub-computation-results to obtain computation results of the quantum computing task; and returning, by the server, the computation results to the user equipment.

Specifically, the method includes the following steps.

Step 4201: A user equipment sending a quantum computing task to the server.

Step 4202: The server acquiring a computing resource currently allowed to be used by a computing device.

Step 4203: The server processing the quantum computing task based on a computing resource currently allowed to be used by the computing device, to obtain a plurality of computing sub-tasks.

Step 4204: The server distributing the plurality of computing sub-tasks to the computing devices;

Step 4205: The computing devices executing the plurality of computing sub-tasks to obtain a plurality of sub-computation-results.

Step 4206: The computing devices sending the plurality of sub-computation results to the server.

Step 4207: The server combining the plurality of sub-computation-results to obtain computation results of the quantum computing task.

Step 4208: The server sending the computation results to the user equipment.

The quantum computing task is generally represented by using a quantum circuit.

The computing resource is a system that follows a quantum mechanics rule and may be used for quantum information processing and storage. A basic unit of the computing resource is a qubit, and the computing resource includes a quantum processor, a quantum memory, and the like.

The computing device includes a quantum computer, a quantum virtual machine, or a high-performance classical computing cluster.

It may be learned that in this embodiment of the present application, a server receives a quantum computing task sent by a user equipment, processes the quantum computing task based on a computing resource currently allowed to be used by the computing device, to obtain a plurality of computing sub-tasks, distributes the plurality of computing sub-tasks to the computing device, receives a plurality of sub-computation-results returned by the computing device for the plurality of computing sub-tasks, combines the plurality of sub-computation-results to obtain computation results of the quantum computing task, and returns the computation results to the user equipment. The server and the computing device form a distributed quantum computing system. Based on a computing resource currently allowed to be used by the computing device, a quantum computing task is divided into a plurality of computing sub-tasks, and the plurality of computing sub-tasks are processed by the computing device. A distributed quantum computing task processing manner is used, which breaks through a limitation on a number of qubits, so that processing of a computing task that cannot be separately processed by a single NISQ device is implemented, thereby saving computing time and improving computing efficiency.

In an embodiment of the present application, there are a plurality of computing devices, and the computing resource currently allowed to be used includes a qubit currently allowed to be used. The processing, by the server, the quantum computing task based on a computing resource currently allowed to be used by the computing device, to obtain a plurality of computing sub-tasks includes: determining, by the server, a qubit currently allowed to be used by each computing device; determining, by the server, a target computing device based on the qubit currently allowed to be used by each computing device and a number of the qubits required by a quantum circuit corresponding to the quantum computing task; determining, by the server based on a qubit currently allowed to be used by the target computing device, a cutting position of the quantum circuit corresponding to the quantum computing task; and cutting, by the server, the quantum circuit into a plurality of quantum sub-circuits based on the cutting position of the quantum circuit, where each quantum sub-circuit corresponds to one computing sub-task.

The target computing device includes at least one computing device, and a number of qubits currently allowed by the at least one computing device is greater than or equal to a number of qubits required by the quantum circuit.

The determining, by the server based on a qubit currently allowed to be used by the target computing device, a cutting position of the quantum circuit corresponding to the quantum computing task includes: acquiring, by the server, a connected graph of the quantum circuit corresponding to the quantum computing task, where a vertex of the connected graph is used to represent a quantum logic gate in the quantum circuit, and a directed edge of the connected graph is used to represent a dependency relationship of the quantum logic gate in an evolution time sequence of a quantum state of a qubit; obtaining, by the server, $q_i$ consecutive vertexes from vertexes of the connected graph, and using the $q_i$ consecutive vertexes as vertexes of the $i^{th}$ connected sub-graph, where a number of qubits included in the $q_i$ consecutive vertexes is equal to a number of qubits currently allowed to be used by the $i^{th}$ computing device; using, by the server, any point on a directed edge between the vertex included in the $i^{th}$ connected sub-graph and a vertex, in the connected graph, other than the vertex included in the $i^{th}$ connected sub-graph as the first cut position of the connected graph; deleting, by the server, the $i^{th}$ connected sub-graph to obtain a new connected graph; and setting, by the server, i=i+1, and then performing the step of obtaining $q_i$ consecutive vertexes from the vertexes of the connected graph, and using the $q_i$ consecutive vertexes as the vertexes of the $i^{th}$ connected sub-graph until all first cut points are determined.

Two quantum logic gates corresponding to the first cut points in the quantum circuit are determined.

A change in a same qubit acted on by the two quantum logic gates from a quantum state evolution corresponding to an action of one quantum logic gate to a quantum state evolution corresponding to an action of the other quantum logic gate is used as the cutting position.

In the embodiments of the present application, the determining, by the server, a target computing device based on the qubit currently allowed to be used by each computing device and a number of the qubits required by a quantum circuit corresponding to the quantum computing task includes: determining, by the server, a plurality of device combination strategies based on the qubit currently allowed to be used by each computing device and the number of the qubits required by the quantum circuit corresponding to the quantum computing task, where each device combination strategy includes a plurality of computing devices; determining, by the server, a target device combination strategy based on a number of computing devices in each device combination strategy and a total number of qubits currently allowed to be used; and determining, by the server, a plurality of computing devices included in the target device combination strategy as target computing devices.

For example, it is assumed that there are four computing devices. A number of qubits currently allowed to be used by a computing device A is 4, a number of qubits currently allowed to be used by a computing device B is 3, a number of qubits currently allowed to be used by a computing device C is 3, and a number of qubits currently allowed to be used by a computing device D is 2. If a number of qubits required by a quantum circuit corresponding to a quantum computing task is 6, the following four device combination strategies exist: strategy 1: the computing device A and the computing device B; strategy 2: the computing device A and the computing device C; strategy 3: the computing device A and the computing device D; and strategy 4: the computing device B and the computing device C.

In an embodiment of the present application, the determining, by the server, a target device combination strategy based on a number of computing devices in each device combination strategy and a total number of qubits currently allowed to be used includes:

determining, by the server as the target device combination strategy, a device combination strategy having the least number of computing devices and/or the least total number of qubits currently allowed to be used.

For example, for the foregoing four device combination strategies, the number of computing devices included in strategy 1 is 2, and the total number of qubits currently allowed to be used is 7; the number of computing devices included in strategy 2 is 2, and the total number of qubits currently allowed to be used is 7; the number of computing devices included in strategy 3 is 2, and the total number of qubits currently allowed to be used is 6; and the fourth number of computing devices included in strategy 4 is 2, and the total number of qubits currently allowed to be used is 6.

If a device combination strategy having the least number of computing devices is determined as the target device combination strategy, all the four types may be used. If a device combination strategy having the least total number of qubits currently allowed to be used is determined as the target device combination strategy, strategy 3 or strategy 4 may be used. If a device combination strategy having the least number of computing devices and the least total number of qubits currently allowed to be used is determined as the target device combination strategy, strategy 3 or strategy 4 may be used.

It may be learned that, in this embodiment of the present application, when a device combination strategy having the least number of computing devices is determined as the target device combination strategy, computation results of subsequent quantum sub-circuits that need to be synthesized may be less, thereby reducing an execution procedure of a quantum computing task, and improving execution efficiency of the quantum computing task; when a device combination strategy having the least total number of qubits currently allowed to be used is determined as the target device combination strategy, a probability that qubits currently allowed to be used by a computing device in a single device combination strategy are not fully used may be reduced, thereby improving utilization efficiency of a computing resource.

In an embodiment of the present application, the method further includes: determining, by the server, a number of qubits currently allowed to be used by each computing device in each device combination strategy; determining, by the server based on the number of qubits currently allowed to be used by each computing device in each device combination strategy, a maximum number of qubits currently allowed to be used by a single computing device in each device combination strategy; and determining, by the server as the target device combination strategy, a device combination strategy having the smallest maximum number of qubits currently allowed to be used by a single computing device.

For example, for the foregoing four device combination strategies, in device combination strategy 1, a number of qubits currently allowed to be used by the computing device A is 4, and a number of qubits currently allowed to be used by the computing device B is 3. Therefore, the maximum number of qubits currently allowed to be used by a single computing device in device combination strategy 1 is 4.

In device combination strategy 2, a number of qubits currently allowed to be used by the computing device A is 4, and a number of qubits currently allowed to be used by the computing device C is 3. Therefore, the maximum number of qubits currently allowed to be used by a single computing device in device combination strategy 2 is 4.

In device combination strategy 3, a number of qubits currently allowed to be used by the computing device A is 4, and a number of qubits currently allowed to be used by the computing device D is 2. Therefore, the maximum number of qubits currently allowed to be used by a single computing device in device combination strategy 3 is 4.

In device combination strategy 4, a number of qubits currently allowed to be used by the computing device B is 4, and a number of qubits currently allowed to be used by the computing device C is 3. Therefore, the maximum number of qubits currently allowed to be used by a single computing device in device combination strategy 4 is 3.

If a device combination strategy having the smallest maximum number of qubits currently allowed to be used by a single computing device is determined as the target device combination strategy, the strategy 4 is selected.

It may be learned that in this embodiment of the present application, the server determines a device combination strategy having the smallest maximum number of qubits currently allowed to be used by a single computing device as the target device combination strategy, so that a number of qubits currently allowed to be used by a remaining computing device is as large as possible. When a next quantum computing task that requires a relatively large number of qubits is executed, cutting does not need to be performed, thereby simplifying an execution process of the quantum computing task and improving accuracy of computation results of the quantum computing task.

In an embodiment of the present application, the combining, by the server, the plurality of sub-computation-results to obtain computation results of the quantum computing task includes: determining, by the server, a plurality of tensors corresponding to the plurality of sub-computation-results; and determining, by the server as the computation results of the quantum computing task, a tensor obtained by contracting the plurality of tensors.

Each sub-computation-result is a density matrix, and each density matrix corresponds to one tensor.

Further, a tensor contraction method includes: if an output node of a density matrix I is equal to an input node of a density matrix J, combining the density matrix I and the density matrix J to obtain a density matrix K, where an input node of the density matrix K is the same as an input node of the density matrix I, and an output node of the density matrix K is the same as an output node of the density matrix J.

For example, it is assumed that sub-computation-results of a quantum sub-circuit is $\Lambda 1_{Q_{o3}}{}^{Q_{i1}}$ and $\Lambda 2_{Q_{o1}}{}^{Q_{i3}}$.

$Q_{i1}$ and $Q_{i3}$ respectively indicate that input nodes of the quantum sub-circuit are a qubit q[1] and a qubit q[3], the input nodes are quantum input nodes, and the quantum input nodes indicate that a timeline where the qubits are located is a downstream timeline obtained after cutting. $Q_{o3}$ and $Q_{o1}$ respectively indicate that output nodes of the quantum sub-circuit are a qubit q[3] and a qubit q[1], the output nodes are quantum output nodes, and the quantum output nodes indicate that a timeline where the qubits are located is an upstream timeline obtained after cutting.

According to the foregoing contraction method, contraction may be performed as follows:

$$\Lambda 1_{Q_{o3}}{}^{Q_{i1}} \Lambda 2_{Q_{o1}}{}^{Q_{i3}} = \Lambda_{Q_{o1}}{}^{Q_{i1}} = \Lambda$$

where $\Lambda$ is a real number.

It may be learned that in this embodiment of the present application, the server determines a plurality of tensors corresponding to the plurality of sub-computation-results, and determines a tensor obtained by contracting the plurality of tensors as a computation result of the quantum calculation task, so as to convert a measurement result of the quantum sub-circuit into a computation result of the quantum calculation task, thereby implementing processing of a computing task that cannot be separately processed by a single NISQ device, saving computing time, and improving computing efficiency.

Figure 8:
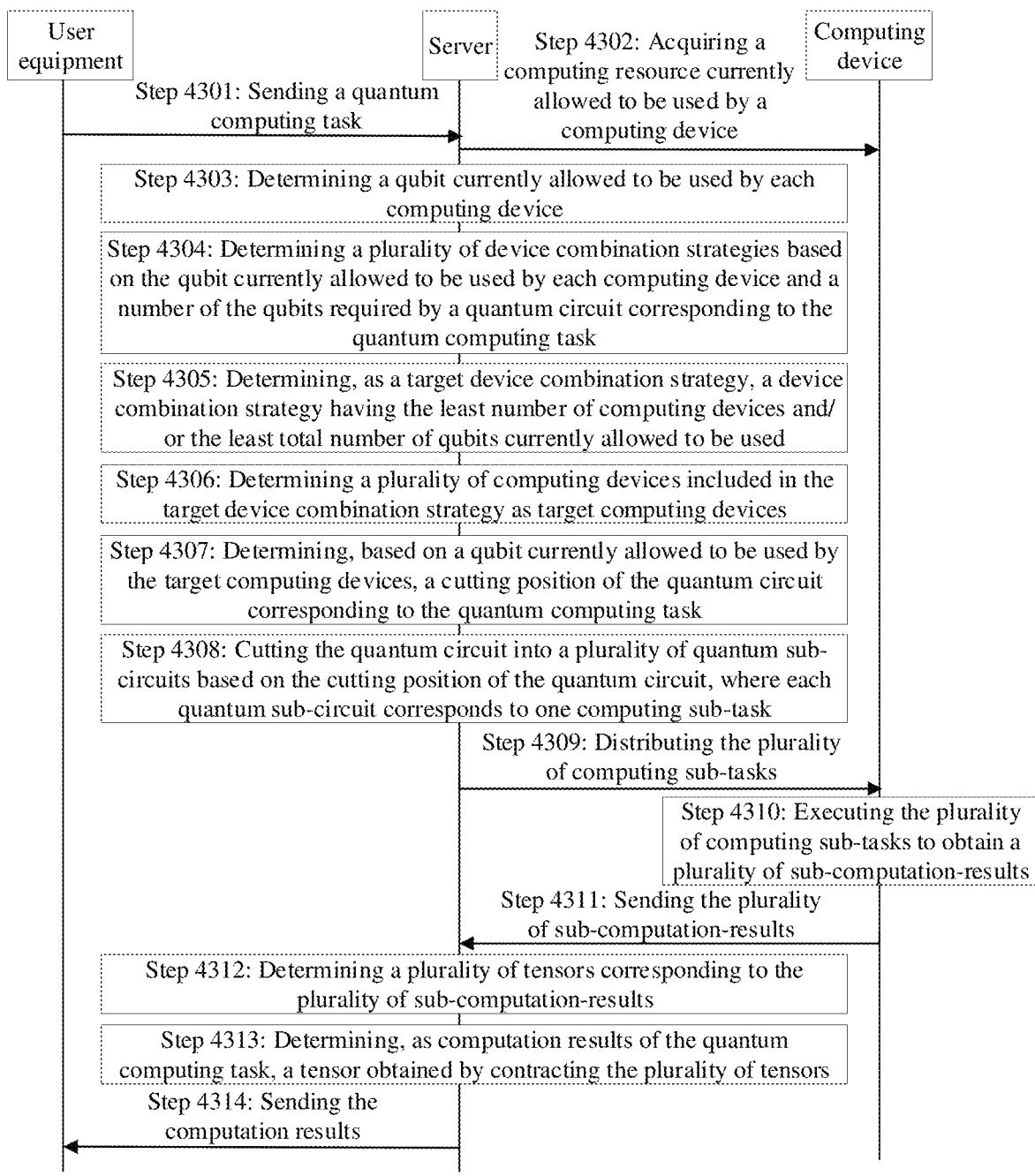
FIG. 8 is a schematic flowchart of another quantum computing task processing method according to an embodiment of the present application.

Referring to FIG. 8, FIG. 8 is a schematic flowchart of another quantum computing task processing method according to an embodiment of the present application, applied to a distributed quantum computing system, where the distributed quantum computing system includes a server and a computing device, and the method includes following steps.

Step 4301: A user equipment sends a quantum computing task to the server.

Step 4302: The server acquires a computing resource currently allowed to be used by the computing device, there are a plurality of computing devices, and the computing resource currently allowed to be used includes a qubit currently allowed to be used.

Step 4303: The server determines a qubit currently allowed to be used by each computing device.

Step 4304: The server determines a plurality of device combination strategies based on the qubit currently allowed to be used by each computing device and the number of the qubits required by the quantum circuit corresponding to the quantum computing task, where each device combination strategy includes a plurality of computing devices.

Step 4305: The server determines, as a target device combination strategy, a device combination strategy having the least number of computing devices and/or the least total number of qubits currently allowed to be used.

Step 4306: The server determines a plurality of computing devices included in the target device combination strategy as target computing devices.

Step 4307: The server determines, based on a qubit currently allowed to be used by the target computing devices, a cutting position of the quantum circuit corresponding to the quantum computing task.

Step 4308: The server cuts the quantum circuit into a plurality of quantum sub-circuits based on the cutting position of the quantum circuit, where each quantum sub-circuit corresponds to one computing sub-task.

Step 4309: The server distributes the plurality of computing sub-tasks to the target computing devices.

Step 4310: The target computing devices execute the plurality of computing sub-tasks to obtain a plurality of sub-computation-results.

Step 4311: The target computing devices send the plurality of sub-computation-results to the server.

Step 4312: The server determines a plurality of tensors corresponding to the plurality of sub-computation-results.

Step 4313: The server determines, as computation results of the quantum computing task, a tensor obtained by contracting the plurality of tensors.

Step 4314: The server sends the computation results to the user equipment.

It should be noted that, for a specific implementation process of this embodiment, reference may be made to the specific implementation process described in foregoing method embodiments. Details are not described herein again.

Figure 9:
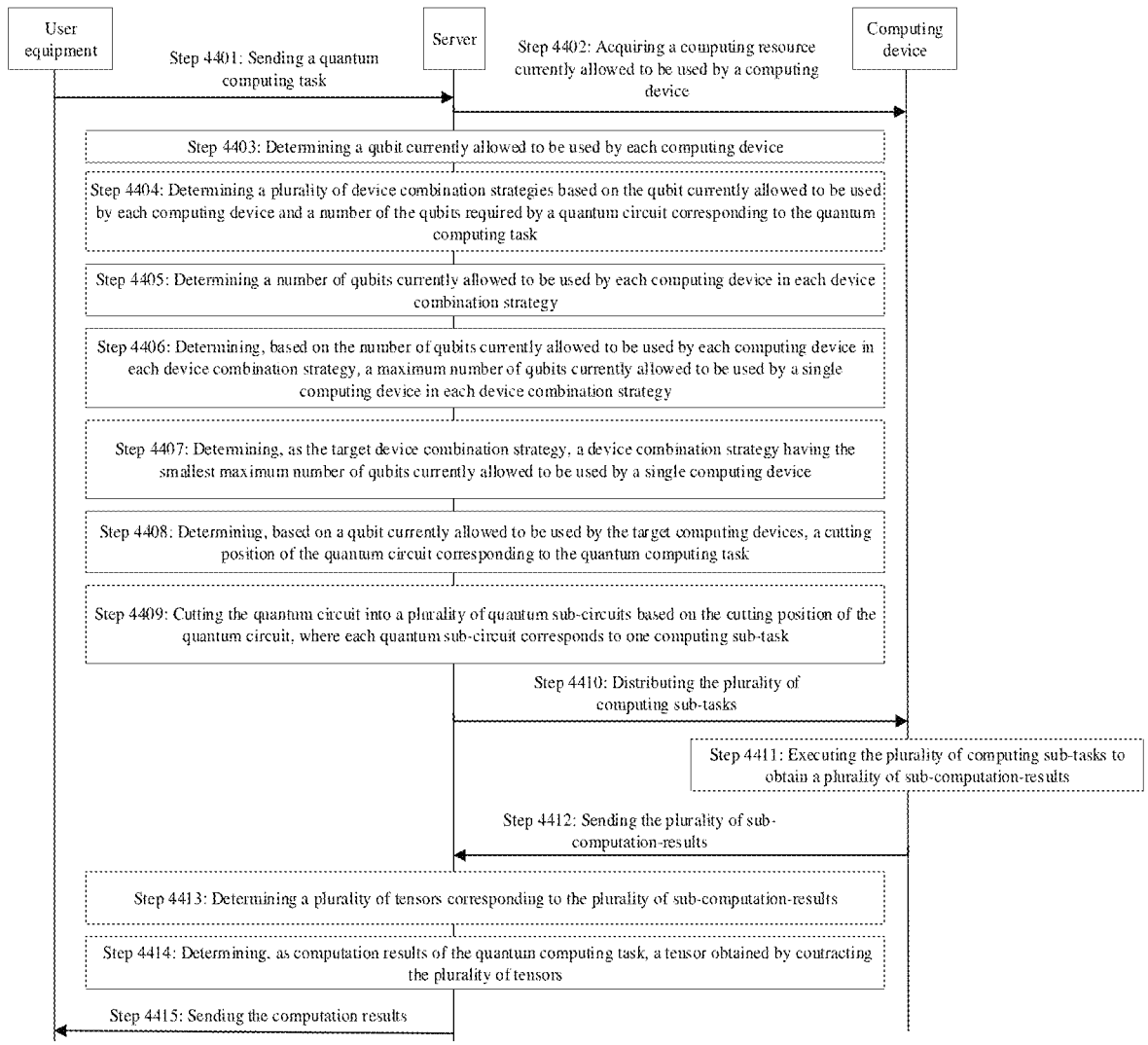
FIG. 9 is a schematic flowchart of yet another quantum computing task processing method according to an embodiment of the present application.

Referring to FIG. 9, FIG. 9 is a schematic flowchart of another quantum computing task processing method according to an embodiment of the present application, applied to a distributed quantum computing system, where the distributed quantum computing system includes a server and a computing device, and the method includes following steps.

Step 4401: A user equipment sends a quantum computing task to the server.

Step 4402: The server acquires a computing resource currently allowed to be used by the computing device, there are a plurality of computing devices, and the computing resource currently allowed to be used includes a qubit currently allowed to be used.

Step 4403: The server determines a qubit currently allowed to be used by each computing device.

Step 4404: The server determines a plurality of device combination strategies based on the qubit currently allowed to be used by each computing device and the number of the qubits required by the quantum circuit corresponding to the quantum computing task, where each device combination strategy includes a plurality of computing devices.

Step 4405: The server determines a number of qubits currently allowed to be used by each computing device in each device combination strategy.

Step 4406: The server determines, based on the number of qubits currently allowed to be used by each computing device in each device combination strategy, a maximum number of qubits currently allowed to be used by a single computing device in each device combination strategy.

Step 4407: The server determines, as the target device combination strategy, a device combination strategy having the smallest maximum number of qubits currently allowed to be used by a single computing device.

Step 4408: The server determines, based on a qubit currently allowed to be used by the target computing devices, a cutting position of the quantum circuit corresponding to the quantum computing task.

Step 4409: The server cuts the quantum circuit into a plurality of quantum sub-circuits based on the cutting position of the quantum circuit, where each quantum sub-circuit corresponds to one computing sub-task.

Step 4410: The server distributes the plurality of computing sub-tasks to the target computing devices.

Step 4411: The target computing devices execute the plurality of computing sub-tasks to obtain a plurality of sub-computation-results.

Step 4412: The target computing devices send the plurality of sub-computation-results to the server.

Step 4413: The server determines a plurality of tensors corresponding to the plurality of sub-computation-results.

Step 4414: The server determines, as computation results of the quantum computing task, a tensor obtained by contracting the plurality of tensors.

Step 4415: The server sends the computation results to the user equipment.

It should be noted that, for a specific implementation process of this embodiment, reference may be made to the specific implementation process described in foregoing method embodiments. Details are not described herein again.

With consistency with the foregoing embodiments illustrated in FIG. 7, FIG. 8, and FIG. 9, referring to FIG. 5, FIG. 5 is a schematic structural diagram of an electronic device according to an embodiment of the present application. As shown in FIG. 5, the electronic device includes a processor, a memory, a communications interface, and one or more programs. The one or more programs are stored in the memory, and are configured to be executed by the processor. The program includes instructions used to execute the following steps: receiving a quantum computing task sent by a user equipment; processing the quantum computing task based on a computing resource currently allowed to be used by the computing device, to obtain a plurality of computing sub-tasks; distributing the plurality of computing sub-tasks to the computing device; receiving a plurality of sub-computation-results returned by the computing device for the plurality of computing sub-tasks; combining the plurality of sub-computation-results to obtain computation results of the quantum computing task; and returning the computation results to the user equipment.

In an embodiment of the present application, there are a plurality of computing devices, and the computing resource currently allowed to be used includes a qubit currently allowed to be used. In terms of processing the quantum computing task based on a computing resource currently allowed to be used by the computing device, to obtain a plurality of computing sub-tasks, the program specifically includes instructions used to execute the following steps: determining a qubit currently allowed to be used by each computing device; determining a target computing device based on the qubit currently allowed to be used by each computing device and a number of the qubits required by a quantum circuit corresponding to the quantum computing task; determining, based on a qubit currently allowed to be used by the target computing device, a cutting position of the quantum circuit corresponding to the quantum computing task; and cutting the quantum circuit into a plurality of quantum sub-circuits based on the cutting position of the quantum circuit, where each quantum sub-circuit corresponds to one computing sub-task.

In an embodiment of the present application, in terms of determining a target computing device based on the qubit currently allowed to be used by each computing device and a number of the qubits required by a quantum circuit corresponding to the quantum computing task, the program specifically includes instructions used to execute the following steps: determining a plurality of device combination strategies based on the qubit currently allowed to be used by each computing device and the number of the qubits required by the quantum circuit corresponding to the quantum computing task, where each device combination strategy includes a plurality of computing devices; determining a target device combination strategy based on a number of computing devices in each device combination strategy and a total number of qubits currently allowed to be used; and determining a plurality of computing devices included in the target device combination strategy as target computing devices.

In an embodiment of the present application, in terms of determining a target device combination strategy based on a number of computing devices in each device combination strategy and a total number of qubits currently allowed to be used, the program specifically includes instructions used to execute the following step: determining, as the target device combination strategy, a device combination strategy having the least number of computing devices and/or the least total number of qubits currently allowed to be used.

In an embodiment of the present application, the program further includes instructions used to execute the following steps: determining a number of qubits currently allowed to be used by each computing device in each device combination strategy; determining, based on the number of qubits currently allowed to be used by each computing device in each device combination strategy, a maximum number of qubits currently allowed to be used by a single computing device in each device combination strategy; and determining, as the target device combination strategy, a device combination strategy having the smallest maximum number of qubits currently allowed to be used by a single computing device.

In an embodiment of the present application, in terms of combining the plurality of sub-computation-results to obtain computation results of the quantum computing task, the program specifically includes instructions used to execute the following steps: determining a plurality of tensors corresponding to the plurality of sub-computation-results; and determining, as the computation results of the quantum computing task, a tensor obtained by contracting the plurality of tensors. It should be noted that, for a specific implementation process of this embodiment, reference may be made to the specific implementation process described in foregoing method embodiments. Details are not described herein again. In this embodiment of the present application, the electronic device may be divided into functional units according to method examples. For example, each functional unit may be obtained through division corresponding to each function, or two or more functions may be integrated into one processing unit. The integrated unit may be implemented in a form of hardware, or may be implemented in a form of a software functional unit. It should be noted that unit division in the embodiment of the present application is an example, and is merely logical function division. In actual implementation, there may be another division manner.

Figure 10:
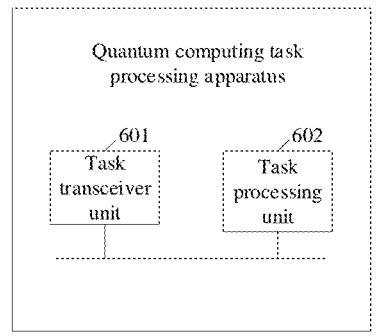
FIG. 10 is a schematic structural diagram of a quantum computing task processing apparatus according to an embodiment of the present application.

The following are apparatus embodiments of the present application. The apparatus embodiments of the present application are used to execute methods implemented in method embodiments of the present application. Referring to FIG. 10, FIG. 10 is a schematic structural diagram of a quantum computing task processing apparatus according to an embodiment of the present application, applied to a distributed quantum computing system, where the distributed quantum computing system includes a server and a computing device, and the apparatus includes: a task transceiver unit 601, configured to receive a quantum computing task sent by a user equipment; and a task processing unit 602, configured to process the quantum computing task based on a computing resource currently allowed to be used by the computing device, to obtain a plurality of computing sub-tasks. The task transceiver unit 601 is further configured to: distribute the plurality of computing sub-tasks to the computing device; and receive a plurality of sub-computation-results returned by the computing device for the plurality of computing sub-tasks. The task processing unit 602 is further configured to combine the plurality of sub-computation-results to obtain computation results of the quantum computing task. The task transceiver unit 601 is further configured to return the computation results to the user equipment.

In an embodiment of the present application, there are a plurality of computing devices, and the computing resource currently allowed to be used includes a qubit currently allowed to be used. In terms of processing the quantum computing task based on a computing resource currently allowed to be used by the computing device, to obtain a plurality of computing sub-tasks, the task processing unit 602 is configured to: determine a qubit currently allowed to be used by each computing device; determine a target computing device based on the qubit currently allowed to be used by each computing device and a number of the qubits required by a quantum circuit corresponding to the quantum computing task; determine, based on a qubit currently allowed to be used by the target computing device, a cutting position of the quantum circuit corresponding to the quantum computing task; and cut the quantum circuit into a plurality of quantum sub-circuits based on the cutting position of the quantum circuit, where each quantum sub-circuit corresponds to one computing sub-task.

In an embodiment of the present application, in terms of determining a target computing device based on the qubit currently allowed to be used by each computing device and a number of the qubits required by a quantum circuit corresponding to the quantum computing task, the task processing unit 602 is configured to: determine a plurality of device combination strategies based on the qubit currently allowed to be used by each computing device and the number of the qubits required by the quantum circuit corresponding to the quantum computing task, where each device combination strategy includes a plurality of computing devices; determine a target device combination strategy based on a number of computing devices in each device combination strategy and a total number of qubits currently allowed to be used; and determine a plurality of computing devices included in the target device combination strategy as target computing devices. In an embodiment of the present application, in terms of determining a target device combination strategy based on a number of computing devices in each device combination strategy and a total number of qubits currently allowed to be used, the task processing unit 602 is configured to: determine, as the target device combination strategy, a device combination strategy having the least number of computing devices and/or the least total number of qubits currently allowed to be used.

In an embodiment of the present application, the task processing unit 602 is configured to: determine a number of qubits currently allowed to be used by each computing device in each device combination strategy; determine, based on the number of qubits currently allowed to be used by each computing device in each device combination strategy, a maximum number of qubits currently allowed to be used by a single computing device in each device combination strategy; and determine, as the target device combination strategy, a device combination strategy having the smallest maximum number of qubits currently allowed to be used by a single computing device.

In an embodiment of the present application, in terms of combining the plurality of sub-computation-results to obtain computation results of the quantum computing task, the task processing unit 602 is configured to: determine a plurality of tensors corresponding to the plurality of sub-computation-results; and determine, as the computation results of the quantum computing task, a tensor obtained by contracting the plurality of tensors.

It should be noted that the task transceiver unit 601 and the task processing unit 602 may be implemented by using a processor.

Figure 11:
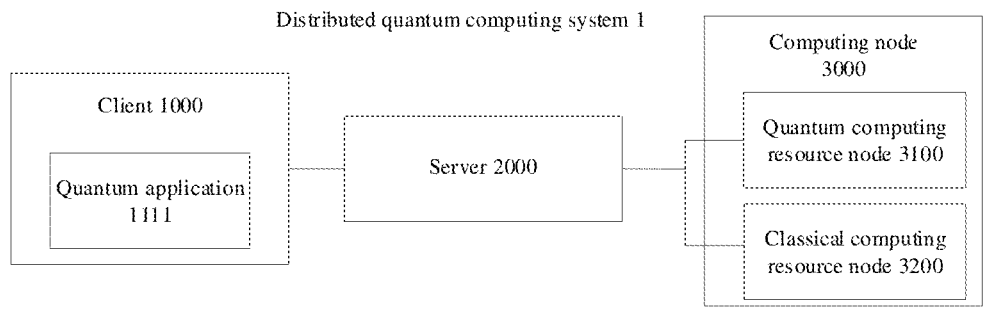
FIG. 11 is a block diagram of a distributed quantum computing system 1 according to an embodiment of the present application.

Referring to FIG. 11, FIG. 11 is a block diagram of a structure of a distributed quantum computing system 1 according to an embodiment of the present application. The distributed quantum computing system 1 includes a client 1000, a server 2000, and a computing node 3000, the computing node 3000 includes a quantum computing resource node 3100 and a classical computing resource node 3200, and the client 1000 includes a quantum application 1111.

The client 1000 is configured to: compile the quantum application 1111 into a hybrid quantum-classical executable program, and submit the hybrid quantum-classical executable program to the server 2000.

The server 2000 is configured to: acquire a quantum computing task corresponding to a quantum program part in the hybrid quantum-classical executable program; cut, based on an evolution process of a quantum state of a qubit in a quantum circuit and quantum computing resource information, the quantum circuit corresponding to the quantum computing task into a plurality of quantum sub-circuits to be prepared; perform initial state preparation on and compile the plurality of quantum sub-circuits to be prepared, to obtain a plurality of executable quantum sub-circuits; and send the plurality of executable quantum sub-circuits to the quantum computing resource node 3100.

The server 2000 is further configured to: acquire a classical computing task corresponding to a classical program part in the hybrid quantum-classical executable program, and send the classical computing task to the classical computing resource node 3100.

The quantum computing resource node 3100 is configured to run the plurality of executable quantum sub-circuits to obtain a plurality of quantum sub-computation-results.

The classical computing resource node 3200 is configured to execute the classical computing task to obtain a classical computation result.

The server 2000 is further configured to: combine the plurality of quantum sub-computation-results and the classical computation result to obtain computation results of the quantum application, and return the computation results of the quantum application 1111 to the client 1000.

Figure 12:
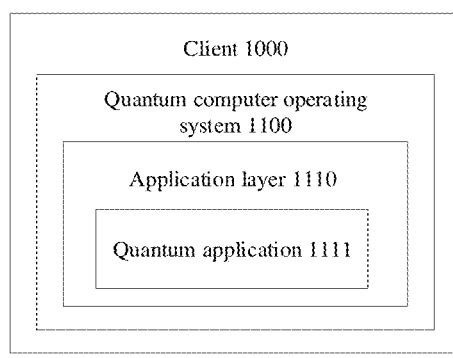
FIG. 12 is a block diagram of a structure of a client 1000 according to an embodiment of the present application.

Further, referring to FIG. 12, FIG. 12 is a block diagram of a structure of a client 1000 according to an embodiment of the present application. The client 1000 includes a quantum computer operating system 1100, an application layer 1110 of the quantum computer operating system 1100 includes the quantum application 1111, and the quantum application 1111 is a hybrid quantum-classical application written in a quantum programming language.

The quantum programming language may be, for example, QRunes, Q#, Cirq, Quipper, or the like.

Figure 13:
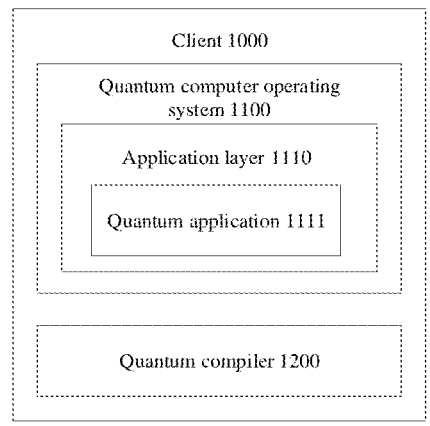
FIG. 13 is a block diagram of a structure of another client 1000 according to an embodiment of the present application.

Further, referring to FIG. 13, FIG. 13 is a block diagram of a structure of another client 1000 according to an embodiment of the present application. The client 1000 includes a quantum compiler 1200.

The quantum compiler 1200 is configured to parse the quantum application into a hybrid quantum-classical executable program.

It may be learned that in this embodiment of the present application, the distributed quantum computing system includes a client, a server, and a computing node, and the computing node includes a quantum computing resource node and a classical computing resource node. The server decomposes a hybrid quantum-classical executable program sent by the client into a quantum computing task and a classical computing task, the quantum computing task is sent to the quantum computing resource node for processing, and the classical computing task is sent to the classical computing resource node for processing, thereby implementing distributed processing of the quantum computing task and the classical computing task, and further implementing efficient running of quantum application.

In terms of sending the quantum computing task to the quantum computing resource node for processing, a server first cuts, based on an evolution process of a quantum state of a qubit in a quantum circuit and quantum computing resource information, the quantum circuit corresponding to the quantum computing task into a plurality of quantum sub-circuits to be prepared, performs initial state preparation on and compiles the plurality of quantum sub-circuits to be prepared, to obtain a plurality of executable quantum sub-circuits, and sends the plurality of executable quantum sub-circuits to the quantum computing resource node for processing, implementing distributed processing of quantum computing tasks, thereby implementing efficient running of the quantum application.

It may be learned that in this embodiment of the present application, not only distributed processing of a quantum computing task and a classical computing task can be implemented, but also distributed processing of a quantum computing task itself can be implemented, thereby implementing efficient running of quantum application.

Figure 14:
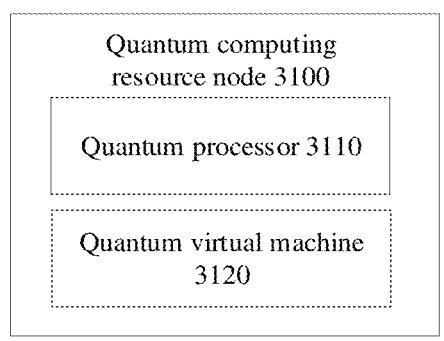
FIG. 14 is a block diagram of a structure of a quantum computing resource node 3100 according to an embodiment of the present application.

Referring to FIG. 14, FIG. 14 is a block diagram of a structure of a quantum computing resource node 3100 according to an embodiment of the present application. The quantum computing resource node 3100 is one or a combination of a physical quantum computing node based on a quantum processor 3110 or a virtual quantum computing resource based on quantum simulation computing.

The quantum virtual computing resource may be, for example, a quantum virtual machine 3120.

There is at least one quantum processor 3110 and at least one quantum virtual machine 3120. Each quantum processor 3110 or each quantum virtual machine 3120 may run at least one quantum computing task.

It should be noted that, because a minimum unit of a quantum processor or a quantum virtual machine is a qubit, when a number of qubits required for a quantum computing task is not greater than the quantum processor, a plurality of quantum computing tasks may be calculated in parallel on a same quantum processor or quantum virtual machine, which is difference from a classical processor on which only one classical task can be executed at a time.

It may be learned that in this embodiment of the present application, a quantum computing resource node includes one or a combination of a physical quantum computing node based on a quantum processor or a virtual quantum computing resource based on simulation computing, and the quantum computing resource node is specifically configured to process a quantum computing task that cannot be processed by a classical computing resource node. In addition, the physical quantum computing node based on a quantum processor or the virtual quantum computing resource based on quantum simulation computing may simultaneously process a plurality of quantum sub-circuits corresponding to a plurality of quantum computing sub-tasks, thereby improving a speed of an original quantum computing task, and further improving operating efficiency of a quantum application.

Figure 15:
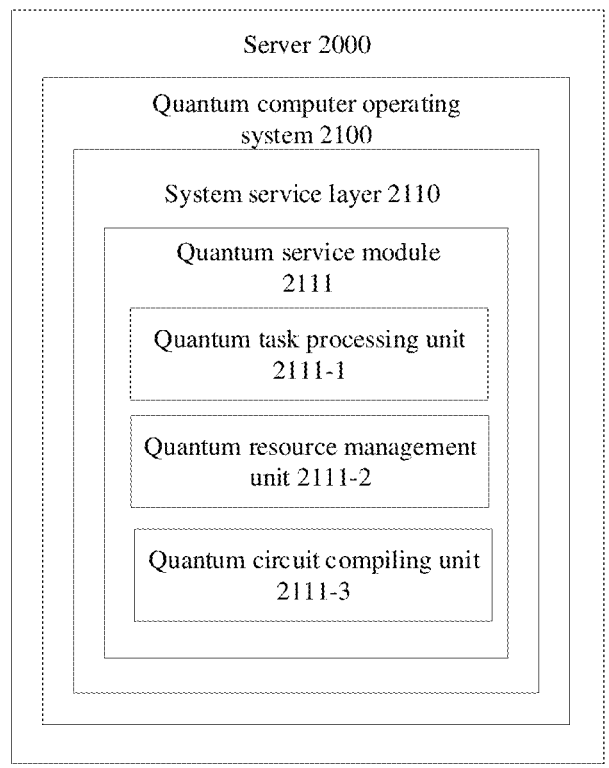
FIG. 15 is a block diagram of a structure of a server 2000 according to an embodiment of the present application.

Referring to FIG. 15, FIG. 15 is a block diagram of a structure of a server 2000 according to an embodiment of the present application. The server 2000 includes a quantum computer operating system 2100, a system service layer 2110 of the quantum computer operating system 2100 includes a quantum service module 2111, and the quantum service module 2111 includes a quantum task processing unit 2111-1, a quantum resource management unit 2111-2, and a quantum circuit compiling unit 2111-3.

The quantum task processing unit 2111-1 is configured to acquire a quantum computing task corresponding to the hybrid quantum-classical executable program.

The quantum resource management unit 2111-2 is configured to acquire quantum computing resource information of the quantum computing resource node.

The quantum task processing unit 2111-1 is further configured to: cut, based on an evolution process of a quantum state of a qubit in a quantum circuit and the quantum computing resource information, the quantum circuit corresponding to the quantum computing task into a plurality of quantum sub-circuits to be prepared, and submit the plurality of quantum sub-circuits to be prepared to the quantum circuit compiling unit 2111-3.

The quantum circuit compiling unit 2111-3 is configured to: perform initial state preparation on and compile the plurality of quantum sub-circuits to be prepared, to obtain a plurality of executable quantum sub-circuits, and send the plurality of executable quantum sub-circuits to the quantum computing resource node 3100.

It may be learned that in this embodiment of the present application, a server cuts, by using a quantum task processing unit and based on an evolution process of a quantum state of a qubit in a quantum circuit and quantum computing resource information, a quantum circuit corresponding to a quantum computing task into a plurality of quantum sub-circuits to be prepared, and prepares and compiles the plurality of quantum sub-circuits to be prepared by using the quantum circuit, to implement cutting, initial state preparation and compilation of the quantum circuit, thereby providing a basis for subsequent running of quantum sub-circuits, implementing distributed running of the quantum sub-circuits, and finally implementing efficient running of quantum application.

In an implementation the present application, in terms of the cutting, based on an evolution process of a quantum state of a qubit in a quantum circuit and the quantum computing resource information, the quantum circuit corresponding to the quantum computing task into a plurality of quantum sub-circuits to be prepared, the quantum task processing unit 2111-1 is configured to: acquire a connected graph of the quantum circuit corresponding to the quantum computing task, where a vertex of the connected graph is used to represent a quantum logic gate in the quantum circuit, and a directed edge of the connected graph is used to represent a dependency relationship of the quantum logic gate in an evolution time sequence of a quantum state of a qubit; determine a vertex of a connected sub-graph of the connected graph based on the quantum computing resource information, and determine a first cut position of the connected graph based on the vertex of the connected sub-graph; and determine a cutting position, on the quantum circuit, corresponding to the first cut point, and cut the quantum circuit based on the cutting position to obtain the plurality of quantum sub-circuits to be prepared.

It should be noted that the vertex of the connected graph may be used to represent a quantum logic gate in a quantum circuit, or may be used to represent a quantum logic gate and a qubit acted on by the quantum logic gate, or may be used to represent another one, which is not limited herein.

It should be further noted that, since existence of a single quantum logic gate does not affect a number of qubits used by a quantum sub-circuit, during drawing of a connected graph of a quantum circuit, the single quantum logic gate is generally removed and position information of the single quantum logic gate is recorded, and execution is resumed after a cutting position of the quantum sub-circuit is obtained.

For example, for a quantum circuit:
q[0]: RX(q[0], 0), CNOT(q[0], q[3]), RX(q[0], 0)
q[1]: RX(q[1], 1), CNOT(q[1], q[2]), CNOT(q[1], q[0]), RX(q[1], 1)
q[2]: RX(q[2], 2), CNOT(q[2], q[3]), RX(q[2], 2)
q[3]: RX(q[3], 3), RX(q[3], 3)

Figure 16:
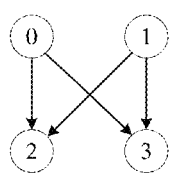
FIG. 16 is a connected graph of a quantum circuit according to an embodiment of the present application.

As shown in FIG. 16, FIG. 16 is a connected graph of a quantum circuit according to an embodiment of the present application. A vertex of the connected graph may be used to represent a quantum logic gate in the quantum circuit. A vertex 0 is used to represent CNOT(q[0], q[3]), a vertex 1 is used to represent CNOT(q[1], q[2]), a vertex 2 is used to represent CNOT(q[1], q[0]), and a vertex 3 is used to represent CNOT(q[2], q[3]).

In an implementation of the present application, the quantum computing resource information includes a number of currently available qubits of a quantum computing resource node. In terms of the determining a vertex of a connected sub-graph of the connected graph based on the quantum computing resource information, the quantum task processing unit 2111-1 is configured to:

determine the vertex of the connected sub-graph of the connected graph, where a number of qubits included in the vertex of the connected sub-graph is less than or equal to a number of qubits currently available for a quantum computing resource node corresponding to the connected sub-graph.

For example, the number of qubits included in the quantum circuit shown in FIG. 16 is 4. If the number of qubits currently available for both a quantum computing resource node A and a quantum computing resource B is 3, a first connected sub-graph may be formed by using the vertex 0 and the vertex 2, and a second connected sub-graph may be formed by using the vertex 1 and the vertex 3. Qubits included in the first connected sub-graph are q[0], q[1], q[3], and qubits included in the second connected sub-graph are q[1], q[2], q[3]. A number of qubits included in both connected sub-graphs is 3, and thus quantum sub-circuits corresponding to the two connected sub-graphs may be allocated to the quantum computing resource node A and the quantum computing resource node B for calculation.

Similarly, the first connected sub-graph may be formed by using the vertex 0 and the vertex 3, and the second connected sub-graph may be formed by using the vertex 2 and the vertex 4.

Further, the determining a first cut position of the connected graph based on the vertex of the connected sub-graph includes: using any point on a directed edge between the vertex included in the connected sub-graph and a vertex, in the connected graph, other than the vertex included in the connected sub-graph as the first cut position of the connected graph.

For example, if a connected sub-graph is formed by the vertex 0 and the vertex 2, any point on directed edges (a directed edge between the vertex 0 and the vertex 3, and a directed edge between the vertex 1 and the vertex 2) between the vertexes 0 and 2 included in the connected sub-graph and the vertexes 1 and 3, in the connected graph, other than the vertexes included in the connected sub-graph as the first cut position of the connected graph, and herein there are two first cut points.

In an implementation of the present application, in terms of the determining a cutting position, on the quantum circuit, corresponding to the first cut point, the quantum task processing unit 2111-1 is configured to: determine two vertexes of a directed edge where the first cut position is located; determine two quantum logic gates, corresponding to the two vertexes, in the quantum circuit; and use, as the cutting position, a change in a same qubit acted on by the two quantum logic gates from a quantum state evolution corresponding to an action of one quantum logic gate to a quantum state evolution corresponding to an action of the other quantum logic gate.

For example, according to the foregoing embodiment, two vertexes on a directed edge on which one cut position is located are the vertex 0 and the vertex 3. A quantum logic gate corresponding to the vertex 0 is CNOT(q[0], q[3]), a quantum logic gate corresponding to the vertex 3 is CNOT (q[2], q[3]), and a same qubit acted on by CNOT(q[0], q[3]) and CNOT(q[2], q[3]) is q[3]. In this case, a change in the qubit q[3] from a quantum state evolution corresponding to an action CNOT(q[0], q[3]) to a quantum state evolution corresponding to an action CNOT(q[2], q[3]) is used as a cutting position.

Similarly, two vertexes on a directed edge on which the other cut position is located are the vertex 1 and the vertex 2, and a change in the qubit q[1] from a quantum state evolution corresponding to an action CNOT(q[1], q[2]) to a quantum state evolution corresponding to an action CNOT (q[1], q[0]) is used as a cutting position. For a cutting process, refer to FIG. 2B.

In an implementation of the present application, in terms of the performing initial state preparation on and compiling the plurality of quantum sub-circuits to be prepared, to obtain a plurality of executable quantum sub-circuits, the quantum circuit compiling unit 2111-3 is configured to: receive the plurality of quantum sub-circuits to be prepared sent by the quantum task processing unit 2111-1, where the quantum sub-circuits to be prepared include a first qubit and a second qubit, a timeline where the first qubit is located is not cut, and a timeline where the second qubit is located is cut; prepare a first quantum state from an initial quantum state of the first qubit by using a first unitary matrix; if the timeline where the second qubit is located is an upstream timeline obtained through cutting, prepare the first quantum state from an initial quantum state of the second qubit by using the first unitary matrix; if the timeline where the second qubit is located is a downstream timeline obtained through cutting, prepare a second quantum state from an initial quantum state of the second qubit by using a second unitary matrix, where the upstream timeline is a timeline located before a cutting position, and the downstream timeline is a timeline located after the cutting position; and compile a plurality of quantum sub-circuits to be prepared for which the first quantum state and the second quantum state are prepared, to obtain a plurality of executable quantum sub-circuits.

For example, as shown in FIG. 2B, in the quantum sub-circuits on the left, a timeline where q[0] is located is not cut, and a timelines where q[1] and q[2] are located have been cut; and in the quantum sub-circuits on the right, a timeline where q[2] is located is not cut, and the timelines where q[1] and q[3] are located have been cut.

The second quantum state includes the following four types: $\vec{OS_0}$, $\vec{OS_1}$, $\vec{OS_2}$, and $\vec{OS_3}$.

The first quantum state is $|0\rangle$, the second quantum state $\vec{OS_0}$ is the same as the first quantum state, and a first unitary matrix corresponding to the first quantum state and a second unitary matrix corresponding to the second quantum state $\vec{OS_0}$ are an identity matrix E.

$$E = \begin{pmatrix} 1 & 0 \\ 0 & 1 \end{pmatrix}.$$

$\vec{OS_1}$ is $\frac{1}{\sqrt{3}}|0\rangle + \sqrt{\frac{2}{3}}|1\rangle$, $\vec{OS_2}$ is $\frac{1}{\sqrt{3}}|0\rangle + \sqrt{\frac{2}{3}} e^{i\frac{2\pi}{3}}|1\rangle$, and $\vec{OS_3}$ is $\frac{1}{\sqrt{3}}|0\rangle + \sqrt{\frac{2}{3}} e^{i\frac{4\pi}{3}}|1\rangle$.

A second unitary matrix corresponding to $\vec{OS_1}$ is $$U_3\left(-2\arccos\frac{1}{\sqrt{3}}, \pi, 0\right),$$

a second unitary matrix corresponding to $\vec{OS_2}$ is $$U_3\left(-2\arccos\frac{1}{\sqrt{3}}, \pi/3, 0\right),$$

and a second unitary matrix corresponding to $\vec{OS_3}$ is $U_3\left(-2\arccos\frac{1}{\sqrt{3}}, -\pi/3, 0\right).$ $$U_3(\theta, \varphi, \lambda) = \begin{pmatrix} \cos\left(\dfrac{\theta}{2}\right) & -e^{i\lambda} \times \sin\left(\dfrac{\theta}{2}\right) \\ e^{i\varphi} \times \sin\left(\dfrac{\theta}{2}\right) & e^{i\lambda+i\varphi} \times \cos\left(\dfrac{\theta}{2}\right) \end{pmatrix}.$$

In an implementation of the present application, in terms of the running the plurality of executable quantum sub-circuits to obtain a plurality of quantum computation results, the quantum computing resource node 3100 is configured to:

measure, on a first measurement basis, a final quantum state of the first qubit obtained after the plurality of executable quantum sub-circuits are run; if the timeline where the second qubit is located is a downstream timeline located after the cutting position, measure, on the first measurement basis, a final quantum state of the second qubit obtained after the plurality of executable quantum sub-circuits are run; if the timeline where the second qubit is located is an upstream timeline located after the cutting position, measure, on a second measurement basis, a final quantum state of the second qubit obtained after the plurality of executable quantum sub-circuits are run; and determine a plurality of quantum sub-computation-results based on the final quantum state of the first qubit and the final quantum state of the second qubit.

The first measurement basis is Z, and the second measurement basis is Z, X, and Y, where $$X = \begin{pmatrix} 0 & 1 \\ 1 & 0 \end{pmatrix}, Y = \begin{pmatrix} 0 & -i \\ i & 0 \end{pmatrix}, \text{ and } Z = \begin{pmatrix} 1 & 0 \\ 0 & -1 \end{pmatrix}.$$

The final quantum state is a Pauli feature state, a Pauli feature state corresponding to Z is $$Z_p = \begin{pmatrix} 1 \\ 0 \end{pmatrix} \text{ or } Z_m = \begin{pmatrix} 0 \\ 1 \end{pmatrix},$$

a Pauli feature state corresponding to X is $$X_p = \frac{1}{\sqrt{2}}\begin{pmatrix} 1 \\ 1 \end{pmatrix} \text{ or } X_m = \frac{1}{\sqrt{2}}\begin{pmatrix} 1 \\ -1 \end{pmatrix},$$

and a Pauli feature state corresponding to Y is $$Y_p = \frac{1}{\sqrt{2}}\begin{pmatrix} 1 \\ i \end{pmatrix} \text{ or } Y_m = \frac{1}{\sqrt{2}}\begin{pmatrix} 1 \\ -i \end{pmatrix}.$$

In an implementation of the present application, in terms of the combining the plurality of quantum sub-computation-results and the classical computation result to obtain computation results of the quantum application, the server 2000 is specifically further configured to:

determine a plurality of tensors corresponding to the plurality of quantum sub-computation-results;

determine, as a quantum computation result, a tensor obtained by contracting the plurality of tensors; and combine the quantum computation results and the classical computation result to obtain the computation results of the quantum application.

For example, as shown in FIG. 2B, for the quantum sub-circuit on the left, an input node corresponding to q[0] is a classical input node, denoted by $C_{i0}$, and an output node is a classical output node, denoted by $C_{o0}$; an input node corresponding to q[1] is a quantum input node, denoted by $Q_{i1}$, and an output node is a classical output node, denoted by $C_{o1}$; and an input node corresponding to q[3] is a classical input node, denoted by $C_{i3}$, and an output node is a quantum output node, denoted by $Q_{o3}$. A density matrix corresponding to the quantum sub-circuit on the left is as follows:

$$\Lambda 1_{C_{o0}C_{o1}Q_{o3}}{}^{C_{i0}Q_{i1}C_{i3}}$$

where initial quantum states of q[0] and q[3] have been determined, and output states of q[0] and q[1] have also been determined as state 0 or state 1. Therefore, a density matrix corresponding to the quantum sub-circuit is as follows:

$$\Lambda 1_{Q_{o3}}{}^{Q_{i1}}$$

For the quantum sub-circuit on the right, an input node corresponding to q[1] is a classical input node, denoted by $C_{i1}$, and an output node is a quantum output node, denoted by $Q_{o1}$; an input node corresponding to q[2] is a classical input node, denoted by $C_{i2}$, and an output node is a quantum output node, denoted by $Q_{o2}$; and an input node corresponding to q[3] is a quantum input node, denoted by $Q_{i3}$, and an output node is a classical output node, denoted by $C_{o3}$. A density matrix corresponding to the quantum sub-circuit is as follows:

$$\Lambda 2_{Q_{o1}C_{o2}C_{o3}}{}^{C_{i1}C_{i2}Q_{i3}}$$

where initial quantum states of q[1] and q[2] have been determined, and output states of q[2] and q[3] have also been determined as state 0 or state 1. Therefore, a density matrix corresponding to the quantum sub-circuit is as follows:

$$\Lambda 2_{Q_{o1}}{}^{Q_{i3}}$$

Therefore, for the two quantum sub-circuits shown in FIG. 2B, Sub-measurement results of one quantum sub-circuit are as follows: a density matrix Λ1(00) corresponding to state |00⟩, a density matrix Λ1(01) corresponding to state |01⟩, a density matrix Λ1(10) corresponding to state |10⟩, and a density matrix Λ1(11) corresponding to state |11⟩.

Sub-measurement results of the other quantum sub-circuit are as follows: a density matrix Λ2(00) corresponding to state |00⟩, a density matrix Λ2(01) corresponding to state |01⟩, a density matrix Λ2(10) corresponding to state |10⟩, and a density matrix Λ2(11) corresponding to state |11⟩.

Each of Λ1(00), Λ1(01), Λ1(10), Λ1(11), Λ2(00), Λ2(01), Λ2(10), and Λ2(11) is a 4×4 complex matrix.

Further, a tensor contraction method specifically includes:

if an output node of a density matrix I is equal to an input node of a density matrix J, combining the density matrix I and the density matrix J to obtain a density matrix K, where an input node of the density matrix K is the same as an input node of the density matrix I, and an output node of the density matrix K is the same as an output node of the density matrix J.

For example, it is assumed that the input node of I is i, the output node thereof is j, denoted by $I_j{}^i$; and an input node of J is j, an output node thereof is k, denoted by $J_k{}^j$. In this case, $$I_j{}^i J_k{}^j = K_k{}^i$$

A density matrix corresponding to the two quantum sub-circuits is as follows:

$$\Lambda 1_{Q_{o3}}{}^{Q_{i1}} \Lambda 2_{Q_{o1}}{}^{Q_{i3}} = \Lambda_{Q_{o1}}{}^{Q_{i1}} = \Lambda$$

where $\Lambda$ is a real number.

Therefore, for $\Lambda 1(00)$, $\Lambda 1(01)$, $\Lambda 1(10)$, $\Lambda 1(11)$, $\Lambda 2(00)$, $\Lambda 2(01)$, $\Lambda 2(10)$, and $\Lambda 2(11)$, $\Lambda 1(00)$ and $\Lambda 2(00)$ may be combined to obtain $\Lambda(00)$, and $\Lambda(00)$ indicates the first quantum state of an original quantum sub-circuit; $\Lambda 1(01)$ and $\Lambda 2(01)$ may be combined to obtain $\Lambda(01)$, and $\Lambda(01)$ indicates the second quantum state of the original quantum sub-circuit; $\Lambda 1(10)$ and $\Lambda 2(10)$ may be combined to obtain $\Lambda(10)$, and $\Lambda(10)$ indicates the third quantum state of the original quantum sub-circuit; and $\Lambda 1(11)$ and $\Lambda 2(11)$ may be combined to obtain $\Lambda(11)$, and $\Lambda(11)$ indicates the fourth quantum state of the original quantum sub-circuit.

It should be noted that a combination of a quantum computation result and a classical computation result is determined based on a relationship, defined in quantum application, between the quantum computation result and the classical computation result. If the two results are in a summation relationship, they are added together; if the two results are in a subtraction relationship, they are subtracted from each other. If the classical computation result is used to check accuracy of the quantum computation result, the two results are subtracted from each other and then the difference is compared with a preset threshold. The two results may alternatively be another relationship, which is not described herein with specific examples.

An embodiment of the present application further provides a computer-readable storage medium. The computer-readable storage medium stores a computer program for exchanging electronic data, where the computer program causes a computer to perform some or all of the steps in any method disclosed in foregoing method embodiments, and the computer includes an electronic device.

An embodiment of the present application further provides a computer program product. The computer program product includes a non-transitory computer-readable storage medium storing a computer program, and the computer program is operable to cause a computer to perform some or all of the steps in any method disclosed in foregoing method embodiments. The computer program product may be a software installation package, and the computer includes an electronic device.

An embodiment of the present application further provides a quantum computer operating system, and the quantum computer operating system is configured to implement some or all processing in any method disclosed in foregoing method embodiments.

It should be noted that, in the foregoing method embodiments, methods are described as a series of action combinations for the purpose of simplicity. However, a person skilled in the art should understand that, the present application is not limited to the described sequence of actions, because some steps may be performed in another order or simultaneously according to the present application. In addition, a person skilled in the art should also understand that embodiments described in this specification are all preferred embodiments, and involved actions and modules are not necessarily required in the present application.

In the foregoing embodiments, descriptions of the embodiments are respectively focused. For a part that is not described in detail in an embodiment, reference may be made to related descriptions in another embodiment.

In the embodiments provided in the present application, it should be understood that the disclosed apparatuses may be implemented in other manners. For example, the described apparatus embodiments are merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatus or units may be implemented in electronic or other forms.

The units described as separate components may be or may not be physically separated, and the components displayed as units may be or may not be physical units, that is, may be located in one place or distributed on a plurality of network units. Some or all of the units may be selected according to actual needs to achieve the objective of the solutions of the embodiments.

In addition, function units in the embodiments of the present application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable memory. Based on such an understanding, the technical solutions of the present application essentially, or the part contributing to the conventional technology, or all or some of the technical solutions may be implemented in the form of a software product. The computer software product is stored in a memory and includes several instructions for instructing a computer device (which may be a personal computer, a server, a network device, or the like) to perform all or some of the steps of the methods described in embodiments of the present application. The foregoing memory includes media that may store program code, such as a USB flash disk, a read-only memory (Read-Only Memory, ROM), a random access memory (Random Access Memory, RAM), a removable hard disk, a magnetic disk, or an optical disk.

Those of ordinary skill in the art may understand that all or some of the steps in methods of the foregoing embodiments may be completed by instructing relevant hardware through a computer program, and the program may be stored in a computer-readable memory. The computer-readable memory may include a flash memory, a read-only memory (Read-Only Memory, ROM for short), a random access memory (Random Access Memory, RAM for short), a magnetic disk, an optical disk or the like.

The foregoing embodiments of the present application are described in detail. Specific examples are used in this specification to describe a principle and implementation of the present application. The foregoing embodiments are merely intended to help understand a method and core idea of the present application. In addition, a person of ordinary skill in the art may change a specific implementation and an application scope according to an idea of the present application. In conclusion, content of this specification should not be construed as a limitation to the present application.

What is claimed is:

1. A quantum computing task processing method, comprising:
    cutting a quantum circuit corresponding to a quantum computing task into a plurality of quantum sub-circuits based on an evolution process of a quantum state of a qubit in the quantum circuit;

separately preparing an initial quantum state of a qubit in each of the quantum sub-circuits;

measuring a qubit, obtained after the initial quantum state is prepared, in each of the quantum sub-circuits, to obtain measurement results of each of the quantum sub-circuits; and combining the measurement results of each of the quantum sub-circuits to obtain computation results of the quantum computing task;

wherein the combining the measurement results of each of the quantum sub-circuits to obtain computation results of the quantum computing task comprises:

determining a density matrix corresponding to the measurement results of each of the quantum sub-circuits;

combining, based on a tensor contraction method, density matrices corresponding to measurement results of the plurality of quantum sub-circuits to obtain a density matrix corresponding to measurement results of the quantum circuit; and determining the density matrix corresponding to the measurement results of the quantum circuit as the computation results of the quantum computing task.

2. The method according to claim 1, wherein the tensor contraction method comprises:

if an output node of a density matrix I is equal to an input node of a density matrix J, combining the density matrix I and the density matrix J to obtain a density matrix K, wherein an input node of the density matrix K is the same as an input node of the density matrix I, and an output node of the density matrix K is the same as an output node of the density matrix J.

3. The method according to claim 1, wherein before the combining, based on a tensor contraction method, density matrices corresponding to measurement results of the plurality of quantum sub-circuits to obtain a density matrix corresponding to measurement results of the quantum circuit, the method further comprises:

determining a qubit comprised in each of the quantum sub-circuits;

if a timeline where the qubit is located is not cut, determining an input node corresponding to the qubit as a classical input node, and determining an output node corresponding to the qubit as a classical output node;

if a timeline where the qubit is located is an upstream timeline obtained through cutting, determining an input node corresponding to the qubit as the classical input node, and determining an output node corresponding to the qubit as a quantum output node;

if a timeline where the qubit is located is a downstream timeline obtained through cutting, determining an input node corresponding to the qubit as a quantum input node, and determining an output node corresponding to the qubit as the classical output node; and determining, based on the classical input node, the classical output node, the quantum input node, and the quantum output node, an input node and an output node of a density matrix corresponding to the measurement results of each of the quantum sub-circuits.

4. The method according to claim 1, wherein the cutting a quantum circuit corresponding to a quantum computing task into a plurality of quantum sub-circuits based on an evolution process of a quantum state of a qubit in the quantum circuit comprises:

determining, based on a greedy algorithm and the evolution process of a quantum state of a qubit in the quantum circuit, a cutting position of the quantum circuit corresponding to the quantum computing task; and cutting the quantum circuit into the plurality of quantum sub-circuits based on the cutting position.

5. The method according to claim 1, wherein the cutting a quantum circuit corresponding to a quantum computing task into a plurality of quantum sub-circuits based on an evolution process of a quantum state of a qubit in the quantum circuit comprises:

determining, based on a computing resource currently allowed to be used by an electronic device and the evolution process of a quantum state of a qubit in the quantum circuit, a cutting position of the quantum circuit corresponding to the quantum computing task; and cutting the quantum circuit into the plurality of quantum sub-circuits based on the cutting position.

6. The method according to claim 5, wherein the computing resource comprises a qubit, and the determining, based on a computing resource currently allowed to be used by an electronic device and the evolution process of a quantum state of a qubit in the quantum circuit, a cutting position of the quantum circuit corresponding to the quantum computing task comprises:

acquiring a connected graph of the quantum circuit corresponding to the quantum computing task, and using a number of qubits currently allowed to be used by the electronic device as a maximum number of qubits allowed to be used by a quantum sub-circuit obtained after the quantum circuit is cut;

determining a first cut position of the connected graph based on the maximum number of qubits;

determining two quantum logic gates corresponding to the first cut position in the quantum circuit; and using, as the cutting position, a change in a same qubit acted on by the two quantum logic gates from a quantum state evolution corresponding to an action of one quantum logic gate to a quantum state evolution corresponding to an action of the other quantum logic gate.

7. The method according to claim 1, wherein the method is applied to a distributed quantum computing system, the distributed quantum computing system comprises a server and a computing device, and the method further comprises:

receiving, by the server, a quantum computing task sent by a user equipment;

processing, by the server, the quantum computing task based on a computing resource currently allowed to be used by the computing device, to obtain a plurality of computing sub- tasks, and distributing the plurality of computing sub-tasks to the computing device, wherein each computing sub-task corresponds to one quantum sub-circuit;

receiving, by the server, a plurality of sub-measurement-results returned by the computing device for the plurality of computing sub-tasks, and combining the plurality of sub- measurement-results to obtain computation results of the quantum computing task; and returning, by the server, the computation results to the user equipment.

8. The method according to claim 7, wherein there are a plurality of computing devices, the computing resource currently allowed to be used comprises a qubit currently allowed to be used, and the processing, by the server, the quantum computing task based on a computing resource currently allowed to be used by the computing device, to obtain a plurality of computing sub-tasks comprises:

determining, by the server, a qubit currently allowed to be used by each computing device;

determining, by the server, a target computing device based on the qubit currently allowed to be used by each computing device and a number of the qubits required by the quantum circuit corresponding to the quantum computing task;

determining, by the server based on a qubit currently allowed to be used by the target computing device, a cutting position of the quantum circuit corresponding to the quantum computing task; and cutting, by the server, the quantum circuit into a plurality of quantum sub-circuits based on the cutting position of the quantum circuit, wherein each quantum sub-circuit corresponds to one computing sub-task.

9. The method according to claim 8, wherein the determining, by the server, a target computing device based on the qubit currently allowed to be used by each computing device and a number of the qubits required by the quantum circuit corresponding to the quantum computing task comprises:

determining, by the server, a plurality of device combination strategies based on the qubit currently allowed to be used by each computing device and the number of the qubits required by the quantum circuit corresponding to the quantum computing task, wherein each device combination strategy comprises a plurality of computing devices;

determining, by the server, a target device combination strategy based on a number of computing devices in each device combination strategy and a total number of qubits currently allowed to be used; and determining, by the server, a plurality of computing devices comprised in the target device combination strategy as target computing devices.

10. The method according to claim 9, wherein the determining, by the server, a target device combination strategy based on a number of computing devices in each device combination strategy and a total number of qubits currently allowed to be used comprises:

determining, by the server as the target device combination strategy, a device combination strategy having the least number of computing devices and/or the least total number of qubits currently allowed to be used.

11. The method according to claim 10, wherein the method further comprises:

determining, by the server, a number of qubits currently allowed to be used by each computing device in each device combination strategy;

determining, by the server based on the number of qubits currently allowed to be used by each computing device in each device combination strategy, a maximum number of qubits currently allowed to be used by a single computing device in each device combination strategy; and determining, by the server as the target device combination strategy, a device combination strategy having the smallest maximum number of qubits currently allowed to be used by a single computing device.

12. The method according to claim 11, wherein the combining, by the server, the plurality of sub-computation-results to obtain computation results of the quantum computing task comprises:

determining, by the server, a plurality of tensors corresponding to the plurality of sub-computation-results; and determining, by the server as the computation results of the quantum computing task, a tensor obtained by contracting the plurality of tensors.

13. An electronic device, comprising a processor, a memory, a communications interface, and one or more programs, wherein the one or more programs are stored in the memory and configured to be executed by the processor, and the programs comprise instructions for executing following steps:

cutting a quantum circuit corresponding to a quantum computing task into a plurality of quantum sub-circuits based on an evolution process of a quantum state of a qubit in the quantum circuit;

separately preparing an initial quantum state of a qubit in each of the quantum sub-circuits;

measuring a qubit, obtained after the initial quantum state is prepared, in each of the quantum sub-circuits, to obtain measurement results of each of the quantum sub-circuits; and combining the measurement results of each of the quantum sub-circuits to obtain computation results of the quantum computing task;

wherein the combining the measurement results of each of the quantum sub-circuits to obtain computation results of the quantum computing task comprises:

determining a density matrix corresponding to the measurement results of each of the quantum sub-circuits;

combining, based on a tensor contraction method, density matrices corresponding to measurement results of the plurality of quantum sub-circuits to obtain a density matrix corresponding to measurement results of the quantum circuit; and determining the density matrix corresponding to the measurement results of the quantum circuit as the computation results of the quantum computing task.

14. The electronic device according to claim 13, wherein the tensor contraction method comprises:

if an output node of a density matrix I is equal to an input node of a density matrix J, combining the density matrix I and the density matrix J to obtain a density matrix K, wherein an input node of the density matrix K is the same as an input node of the density matrix I, and an output node of the density matrix K is the same as an output node of the density matrix J.

15. The electronic device according to claim 13, wherein before the combining, based on a tensor contraction method, density matrices corresponding to measurement results of the plurality of quantum sub-circuits to obtain a density matrix corresponding to measurement results of the quantum circuit, the method further comprises:

determining a qubit comprised in each of the quantum sub-circuits;

if a timeline where the qubit is located is not cut, determining an input node corresponding to the qubit as a classical input node, and determining an output node corresponding to the qubit as a classical output node;

if a timeline where the qubit is located is an upstream timeline obtained through cutting, determining an input node corresponding to the qubit as the classical input node, and determining an output node corresponding to the qubit as a quantum output node;

if a timeline where the qubit is located is a downstream timeline obtained through cutting, determining an input node corresponding to the qubit as a quantum input node, and determining an output node corresponding to the qubit as the classical output node; and determining, based on the classical input node, the classical output node, the quantum input node, and the quantum output node, an input node and an output node of a density matrix corresponding to the measurement results of each of the quantum sub-circuits.

16. The electronic device according to claim 13, wherein the cutting a quantum circuit corresponding to a quantum computing task into a plurality of quantum sub-circuits based on an evolution process of a quantum state of a qubit in the quantum circuit comprises:

determining, based on a greedy algorithm and the evolution process of a quantum state of a qubit in the quantum circuit, a cutting position of the quantum circuit corresponding to the quantum computing task; and cutting the quantum circuit into the plurality of quantum sub-circuits based on the cutting position.

17. A non-transitory computer-readable storage medium, wherein the non-transitory computer-readable storage medium stores a computer program, and the computer program is executed by a processor to implement following steps:

cutting a quantum circuit corresponding to a quantum computing task into a plurality of quantum sub-circuits based on an evolution process of a quantum state of a qubit in the quantum circuit;

separately preparing an initial quantum state of a qubit in each of the quantum sub-circuits;

measuring a qubit, obtained after the initial quantum state is prepared, in each of the quantum sub-circuits, to obtain measurement results of each of the quantum sub-circuits; and combining the measurement results of each of the quantum sub-circuits to obtain computation results of the quantum computing task;

wherein the combining the measurement results of each of the quantum sub-circuits to obtain computation results of the quantum computing task comprises:

determining a density matrix corresponding to the measurement results of each of the quantum sub-circuits;

combining, based on a tensor contraction method, density matrices corresponding to measurement results of the plurality of quantum sub-circuits to obtain a density matrix corresponding to measurement results of the quantum circuit; and determining the density matrix corresponding to the measurement results of the quantum circuit as the computation results of the quantum computing task.

18. A quantum computer operating system, wherein the quantum computer operating system implements processing of a quantum computing task according to the method according to claim 1.

* * * * *